United States Patent
Varone et al.

(10) Patent No.: US 7,103,428 B2
(45) Date of Patent: Sep. 5, 2006

(54) REMOTE DISPLAY MODULE

(75) Inventors: John J. Varone, Seekonk, MA (US); Timothy Clish, Taunton, MA (US); John Burroughs, Exeter, RI (US); Louis Genatossio, Shrewsbury, MA (US); Rama Machireddy, Foxboro, MA (US); Norbert W. Elsdoerfer, Warwick, RI (US); Joseph Chopy, Jr., Cumberland, RI (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 11/071,996

(22) Filed: Mar. 4, 2005

(65) Prior Publication Data
US 2005/0197722 A1 Sep. 8, 2005

Related U.S. Application Data

(63) Continuation of application No. 10/136,908, filed on May 1, 2002, now abandoned, which is a continuation-in-part of application No. 10/023,450, filed on Dec. 17, 2001, now abandoned.

(51) Int. Cl.
*G05B 15/00* (2006.01)
*G05B 11/01* (2006.01)
*G09G 5/00* (2006.01)
*G06F 3/00* (2006.01)
*G06F 9/00* (2006.01)
*G06F 17/00* (2006.01)

(52) U.S. Cl. ............................ 700/83; 700/17; 700/19; 345/1.2; 345/3.1; 715/736; 715/740; 715/746; 715/864; 715/866

(58) Field of Classification Search ................ 700/2–4, 700/17, 19, 20, 83, 84; 345/1.2, 3.1; 715/733, 715/740, 744–747, 864, 866; 341/22, 23
See application file for complete search history.

(56) References Cited

U.S. PATENT DOCUMENTS

| | | | |
|---|---|---|---|
| 4,622,635 A | 11/1986 | Chandra et al. |
| 4,918,930 A | 4/1990 | Gaudet et al. |
| 5,157,928 A | 10/1992 | Gaudet et al. |
| 5,343,708 A | 9/1994 | Gaudet et al. |
| 5,443,368 A | 8/1995 | Weeks et al. |

(Continued)

FOREIGN PATENT DOCUMENTS

EP 385200 A2 9/1990

(Continued)

*Primary Examiner*—Crystal J. Barnes
(74) *Attorney, Agent, or Firm*—Hamilton, Brook, Smith & Reynolds, P.C.

(57) ABSTRACT

A portable display unit includes a serial port to connect to a device such as a vacuum network controller, cryopump, turbomolecular pump, gauges or compressor. In particular, the display unit can be plugged and unplugged to devices of different types. The portable display unit includes a display and control keys for programming, controlling and monitoring the functions of a device. The device accessible to the display unit includes a display interface having software code and files to interface with the display unit. Accordingly, the portable display unit can be used with any device having software code to interface with the display unit. The software code generates, refreshes and communicates menus to the portable display unit to provide graphical interface of the device's functions. The portable display unit further includes inner and outer hand grips so that the display unit can be held by hands of different sizes. The hand grips allow user with different hand sizes to firmly hold and navigate the display using control keys with fingers.

24 Claims, 20 Drawing Sheets

U.S. PATENT DOCUMENTS

| | | |
|---|---|---|
| 5,450,079 A | 9/1995 | Dunaway |
| 5,450,316 A | 9/1995 | Gaudet et al. |
| 5,650,940 A | 7/1997 | Tonozuka et al. |
| 5,731,974 A | 3/1998 | Pietzsch et al. |
| 5,839,097 A | 11/1998 | Klausner |
| 5,889,671 A | 3/1999 | Autermann et al. |
| 6,022,195 A | 2/2000 | Gaudet et al. |
| 6,029,072 A | 2/2000 | Barber |
| 6,203,498 B1 | 3/2001 | Bunce et al. |
| 6,272,400 B1 | 8/2001 | Jankins et al. |
| 6,318,093 B1 | 11/2001 | Gaudet et al. |
| 6,400,462 B1 | 6/2002 | Hille |
| 6,560,492 B1 | 5/2003 | Borders |
| 6,594,548 B1 | 7/2003 | Bagnordi |
| 6,628,257 B1 | 9/2003 | Oka et al. |
| 6,669,600 B1 | 12/2003 | Warner |
| 6,930,730 B1 * | 8/2005 | Maxon et al. ............... 348/734 |
| 2001/0052942 A1 | 12/2001 | MacCollum et al. |
| 2002/0035404 A1 | 3/2002 | Ficco et al. |
| 2002/0047774 A1 * | 4/2002 | Christensen et al. ....... 340/3.54 |
| 2003/0033026 A1 | 2/2003 | Murphy |
| 2003/0114942 A1 * | 6/2003 | Varone et al. ................ 700/83 |
| 2003/0141987 A1 | 7/2003 | Hayes |

FOREIGN PATENT DOCUMENTS

| | | |
|---|---|---|
| WO | WO 97/04370 | 2/1997 |

* cited by examiner

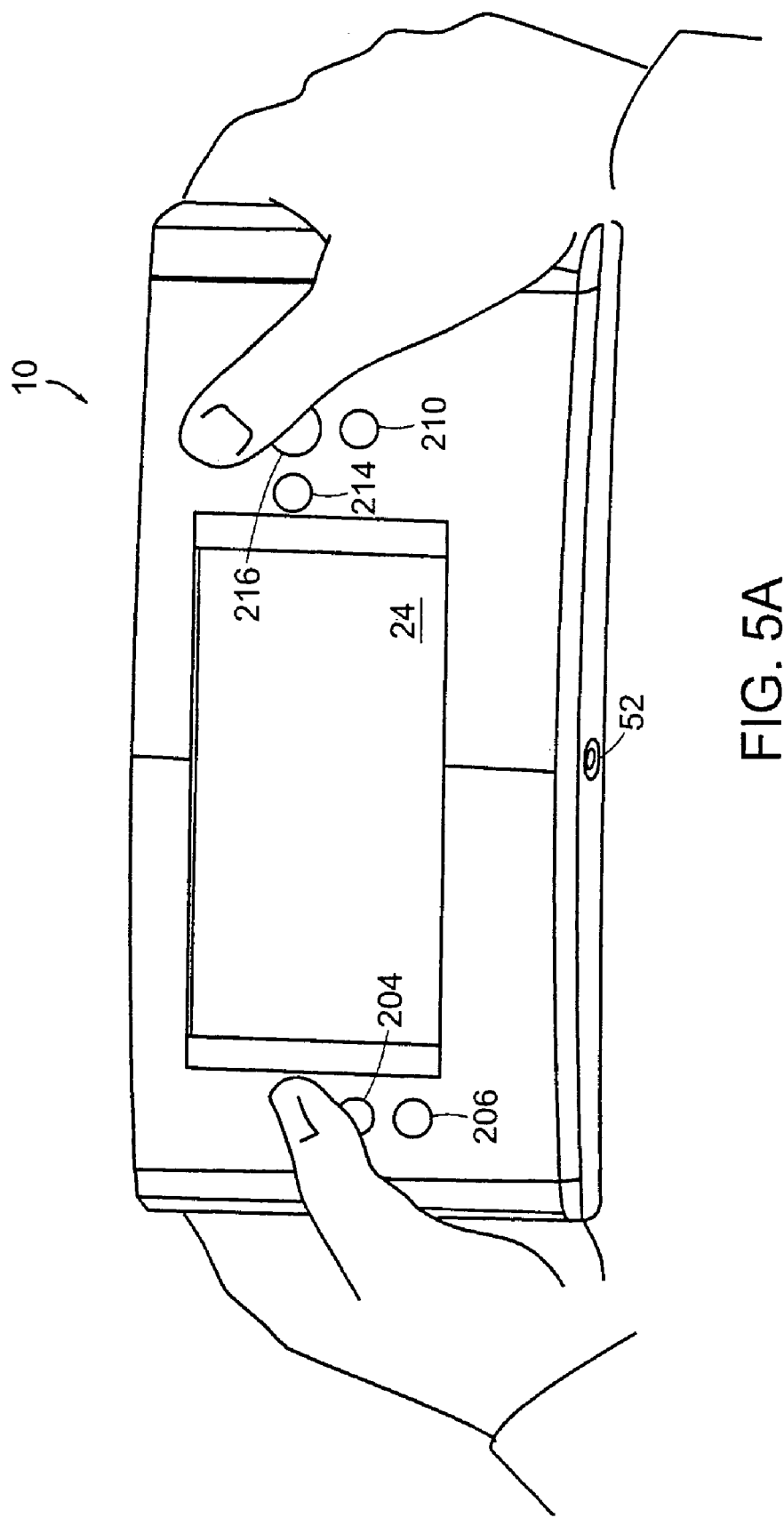

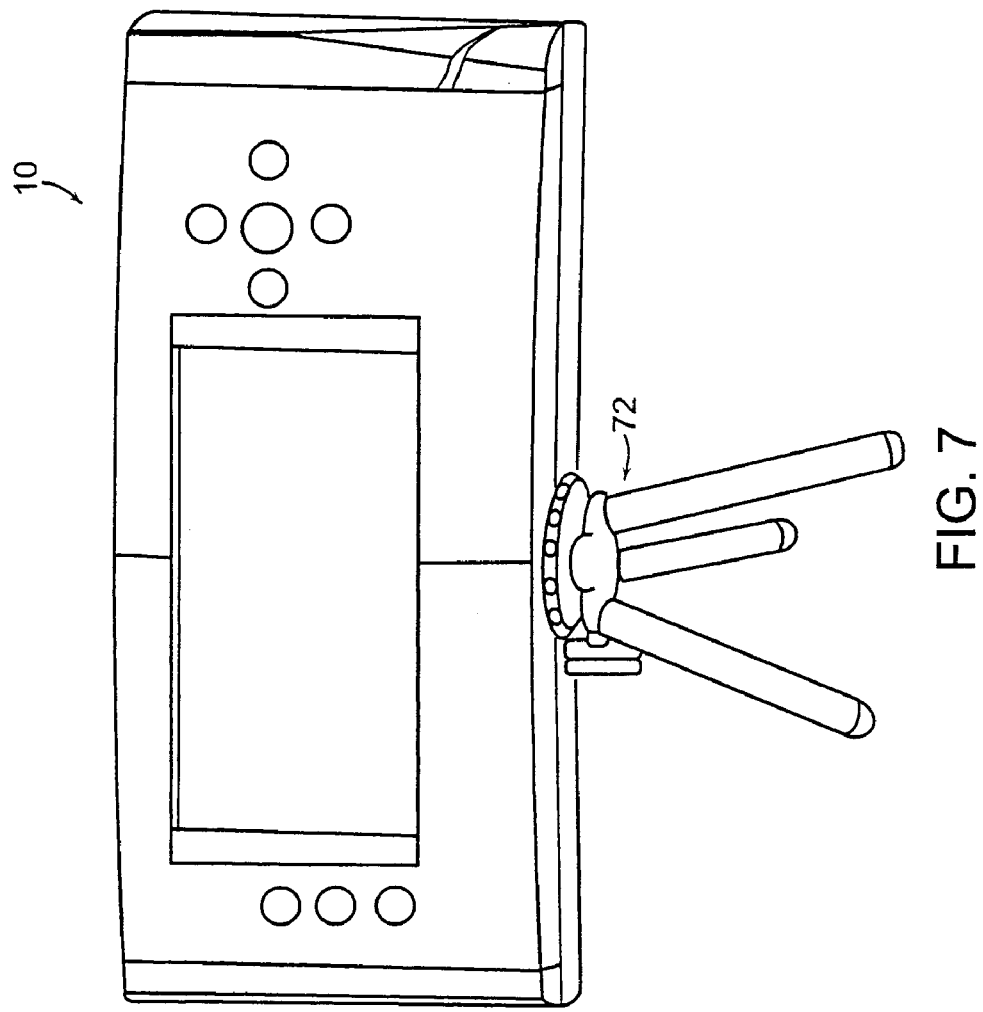

REMOTE DISPLAY MODULE

RELATED APPLICATIONS

This application is a continuation of U.S. application Ser. No. 10/136,908, filed May 1, 2002, which is a continuation-in-part of U.S. application Ser. No. 10/023,450, filed Dec. 17, 2001. The entire teachings of the above applications are incorporated herein by reference.

BACKGROUND OF THE INVENTION

A cluster tool for semiconductor processing generally includes a tool host controller providing top-level control over all systems within the cluster tool. The tool includes a series of processing chambers for performing various semiconductor-fabrication processes such as wafer etching, chemical or plasma vapor deposition, oxidation, sintering, and annealing. These processes often are performed in separate chambers, each of which may include a vacuum system. The vacuum system may include control pads or display units fixed to the devices in the system to provide user interface.

One type of vacuum system that is widely used in semiconductor processing is a cryogenic vacuum system. The cryogenic vacuum system typically includes at least one cryogenic vacuum pump (cryopump) and at least one compressor for supplying compressed helium to the cryopump. The system also often includes other components such as roughing pumps, waterpumps, turbopumps, chillers, valves and gauges. Together, these components operate to provide vacuum to a broader system such as a cluster tool for semiconductor processing.

In addition to the cryopumps, a conventional vacuum system typically includes a network interface terminal which communicates to a tool host controller and the network of cryopumps within the system. The network interface terminal includes an electronic module to monitor and control the devices and components within the network. Similarly, a cryopump may include an electronic module to monitor and control the cryopump.

The electronic modules of the cryopump and network interface terminal may each include a control pad having a keyboard and display. For example, an alphanumeric display displays one line of up to sixteen characters. Longer messages are accessed by horizontal scroll keys. Additional lines of messages and menu items may be displayed by vertical scroll display keys. The keyboard includes numeric keys to input numerical data into the system and functional keys such as ENTER and CLEAR keys to enter and clear data during programming. The keyboard also includes other functional keys to activate device operations. For example, a MONITOR function key allows the display of sensor data and on/off status of the pump and relays. A REGEN function key activates a complete cryopump regeneration cycle, allows regeneration program changes and sets power failure recovery parameters.

SUMMARY OF THE INVENTION

A display unit of one embodiment of this invention includes a display, control keys including UP, DOWN and ENTER keys, a device interface for communicating with a device, such as a vacuum controller, and electronic circuitry. The electronic circuitry receives and displays menus received in messages from the device. The electronic circuitry forwards messages to the device when a control key is activated. The display unit stores, modifies and displays data entered with the control keys and forwards the data to the device.

The display unit further includes volatile memory such as RAM to store data entered with control keys but not yet activated or forwarded to the device. The display unit also includes non-volatile memory such as Flash to store software code. The control keys may also include BACK, HOME and HELP keys to support navigation of menus. The display may also include a filter for a clear view of the display.

The display unit may include a rest stand which pivots from the unit to support the display unit in a range of positions. The display unit can be mounted on a tripod using a camera-type screw connector at the bottom of the display unit or to a bracket. The display unit may include a shock mount for protecting the display. Furthermore, the display unit includes inner and outer hand grips on the back panel. The hand grips allows secure holding of the display unit for hands of different sizes. Also, the hand grips are located at both ends of the display unit so that the display unit can be held by either the left or right hand and navigate menus using the control keys with the other hand. The control keys and hand grips are positioned so that the user may hold the display unit with both hands and navigate with a thumb. In addition, the hand grips stabilize and balance the display unit when placed on a flat surface. Accordingly, the display unit is portable and easy to carry around. In addition, the ability to place and hold the display unit in various positions and angles provide optimum viewing angle of the display.

A device to which the display unit is coupled includes a display interface to connect to the display unit. The device also includes a processor and a computer readable medium storing computer executable software code. The device interface and the computer readable medium are in communication with the processor. The software code stored on the device has the capability to perform the following operations: providing a display driver to communicate with the display unit; generating menus specific to the device; and providing a data interface to request and receive data from the device. The device may be a vacuum network controller, cryopump, compressor, roughing pump or turbopump which may be used in a fabrication plant.

A method of this invention includes the steps of connecting the portable display unit to a device and initializing the display unit. The device generates menus and communicates the menus to the display unit. The display unit forwards a key entry to the device. At the device, the key entry is received and processed to generate a second menu. The second menu is communicated to the display unit. Each of the devices to which the display unit may be coupled may include a display controller, including software code, to generate display menus specific to the device.

A method of use includes providing a portable display unit and connecting the portable display unit to a first device of a first type. The display unit receives menus from the first device, displays the menus, and forwards messages to the device to indicate activation of control keys. Similarly, the method includes connecting the display unit to a second device of a second type. The display unit receives menus from the second device, displays the menus, and forwards messages to the device to indicate activation of control keys.

A display unit may be connected to a vacuum network controller via an interface such as a serial port. Similarly, the display unit also may be directly connected to a device such as a cryopump, a roughing pump, a compressor, or a turbopump. The vacuum network controller performs an initialization routine to assure that there is a proper connection between the vacuum network controller and the display unit. During an initialization process, bitmaps specific to the vacuum network controller may be downloaded to the display unit. Also, the vacuum network controller may check the software on the display unit and update the software if the vacuum network controller finds it to be a different version.

Once the vacuum network controller generates menus, the vacuum network controller communicates the menu to the display unit. The vacuum network controller also includes a display driver to communicate with the display units. The display unit receives the menu and displays the menu on the display. When a control key is pressed and activated, the display unit forwards messages to the vacuum network controller. Similarly, a device connected to a display unit performs the functions described above of the vacuum network controller.

In general, the display unit has two key press modes, polling and non-polling. In a polling mode, the key entry is not sent until a device requests a key entry from the display unit. In a non-polling key press mode, the key entry is sent immediately upon key entry. After the key entry is received at the device, the device processes the key entry and generates a second menu. Depending on the type of the first menu, a second menu is a new menu or the same menu with change in data or refreshed data.

Accordingly, the display unit of the present invention provides a stand alone display unit that is compatible with many vacuum system components and other devices. In particular, the display unit includes control keys and display that support menus for all the functions of a device to which the display unit is connected. In addition, a large display facilitates navigation of menus and messages on the display. A high resolution of the display provides a clear view of the display.

Further, the display unit provides control keys that are easy to use and hand grips for holding and stabilizing on a flat surface. The rest stand and screw connector for standing and mounting respectively allow the display to be view in wide range of positions and angles.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A–5C are pictorial diagrams of FIG. 2 illustrating handgrips and use of handgrips;

FIG. 7 is a view of the display unit of FIG. 2 mounted on a tripod;

DETAILED DESCRIPTION OF THE INVENTION

A description of preferred embodiments of the invention follows.

Figure 1:
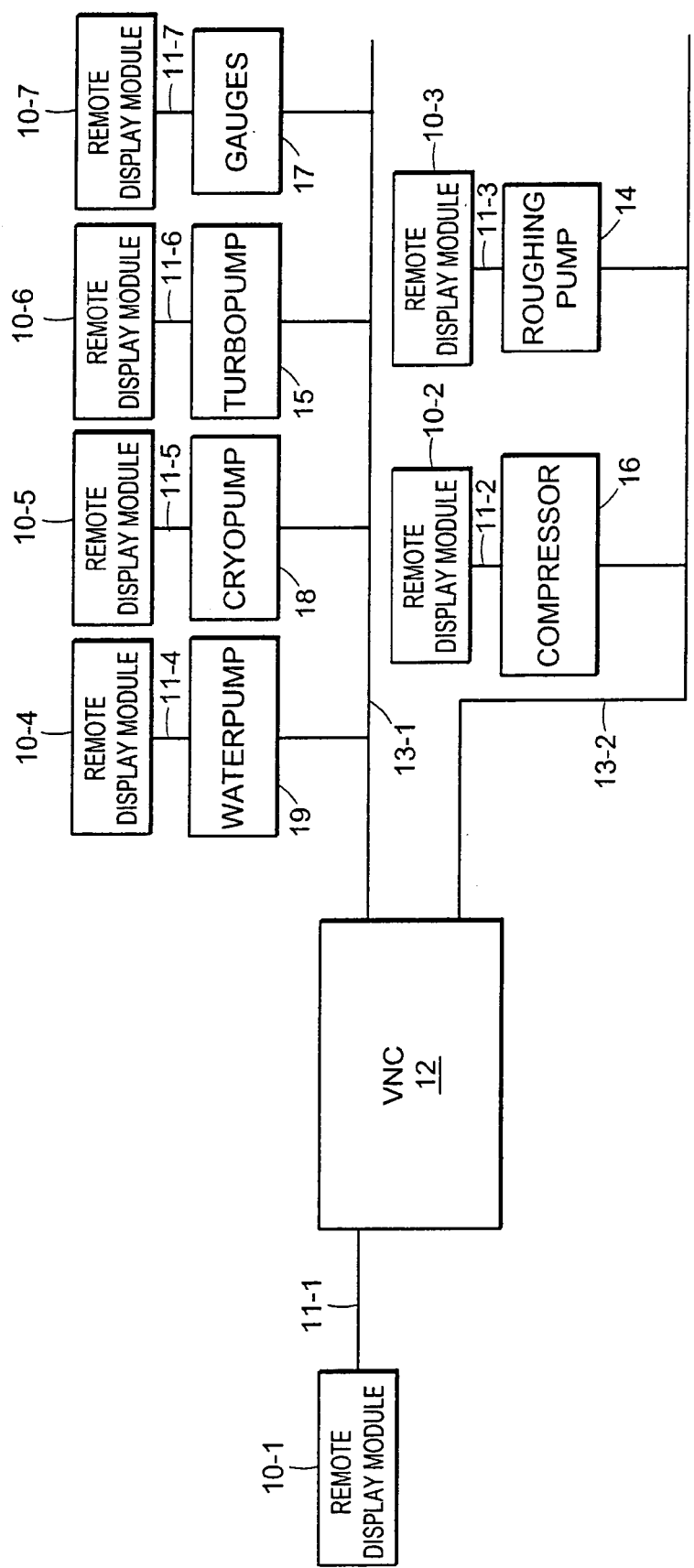
FIG. 1 is a block diagram of a cryogenic vacuum network.

FIG. 1 is a block diagram of a vacuum network. The vacuum network includes a vacuum network controller 12 which is generally connected to a tool host controller which controls the operation of a cluster tool for semiconductor processing. The tool host controller controls the operation of all processes (e.g., etching, chemical vapor deposition, physical vapor deposition, and annealing) performed within the cluster tool as well as the operation of the vacuum network.

The vacuum network further includes component links 13-1, 13-2 which connect network vacuum system components, such as a cryopump 18, a roughing pump 14, a waterpump 19, a compressor 16, gauges 17 and a turbopump 15. The status of each of these components can be monitored and controlled by the vacuum network controller 12. The vacuum network controller also may include a variety of sensors, including a residual gas analyzer, an ion gauge, and a capacitance. The vacuum network controller 12 in a vacuum network may be that described in U.S. Pat. No. 6,272,400 B1, issued Aug. 7, 2001, entitled "Vacuum Network Controller," by Jankins et al., the entire contents of which are incorporated herein by reference.

The display unit 10 is a portable hand held device that may be connected to any of the devices and is powered by the device to which it is connected. The remote display unit 10 provides an user interface to program, control and monitor all functions of the device to which the display unit 10 is connected. For example, as will be discussed in greater detail, the remote display unit 10-1 is connected to the vacuum network controller 12 via display link 11-1 to monitor status, control setup, and program functions of system components/devices connected to the vacuum network controller 12. The display unit 10-5 also can be directly connected to a cryopump 18 through a display link 11-5 to program, control and monitor all cryopump functions using the control keys and display. Similarly, FIG. 1 illustrates a waterpump 19, a turbopump 15, gauges 17, a compressor 16 and a roughing pump 14 connected to respective remote display units 10-2, 10-3, 10-4, 10-5, 10-6, 10-7 through display links 11-2, 11-3, 11-4, 11-5, 11-6, 11-7.

The display unit 10 acts primarily as a slave taking commands from the device. Source code and files to implement this functionality reside on the device. The display unit 10 has some functionality built in to keep the interface simple. However, the display unit 10 can send key presses to the device and the device sends acknowledgment and other messages in response to the key press.

Figure 2:
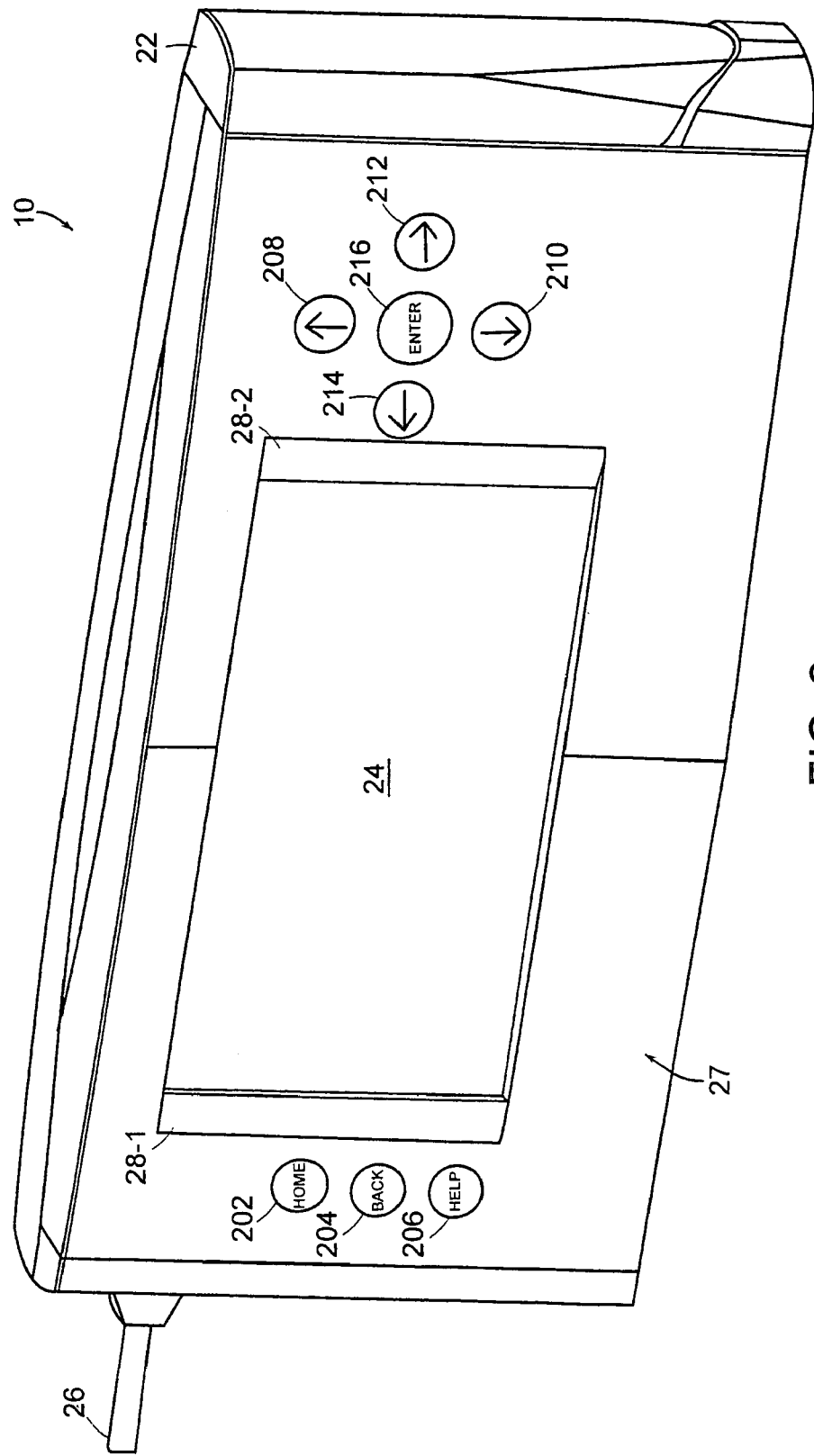
FIG. 2 is a front view of a display unit.

FIG. 2 is a frontal view of the display unit 10 of FIG. 1. The display unit 10 includes a display 24 and control keys 202, 204, 206, 208, 210, 212, 214, 216. The display may have a resolution of about 128×64 pixels to support alphanumeric characters and bitmaps of 21 characters wide and 8 lines high. The control keys include up 208, down 210, left 214 and right 212 arrow scroll keys that are used to navigate around and within the display 24 to change values on the display 24. A selector character such as a right arrow image may be displayed to support the navigation of the display using the arrow scroll keys 208, 210, 212, 214.

The display unit 10 further includes function keys such as HOME 202, BACK 204, HELP 206 and ENTER 216. These function keys may be labeled with symbols to indicate their functions.

An ENTER key 216 is in the center of the arrow keys 208, 210, 212, 214 and has multiple functions depending on the screen/menu being displayed. Preferably, the ENTER key 216 allows a user to choose a new menu to be displayed, change a value and commit the changed value. For example, if the menu includes options to different menus, then the user may change to a new menu by selecting the new menu and pressing the ENTER key 216. In other menus in which a selected value is displayed, such as the BAUD rate of a communication port, the ENTER key 216 allows to modify and commit to a different value.

A HOME key 202 allows the user to return to a main menu from any of the menus being displayed. A BACK key 204 is used to return to the previously displayed menu. If the BACK key 204 is hit while the user is scrolling data to modify the value, then the data is returned to its original value. A HELP key 206 provides additional information about the menu being displayed. The HELP key 206 generates a help menu having additional information. The user may return to the menu from which additional information was requested by hitting the BACK key 204.

The display unit 10 includes a serial port to provide a connection to a vacuum network device. In addition, the serial port provides power to the display unit 10. For example, the serial port may be a RS-232 port using a USB cable 26 to connect to the device. The display unit 10 also includes front panel recesses 28-1, 28-2 on each side of the display 24 to set the display 24 back from the front panel 27 of the display unit 10 for protecting the display from scratching or breaking. The display may be a vacuum fluorescent display having a filter over the display to protect the lens and minimize glare.

In addition, as will be discussed in greater detail, a pivotable rest stand 22 supports positioning of the display unit 10 in various angles. As illustrated in FIG. 2, the rest stand 22 also may be set in a vertical position for securely placing the display unit 10 on a horizontal plane or holding with a hand.

The display unit 10 also has a screen saver mode to increase the life of the display 24. In particular, the screen saver mode protects the display by preventing phosphorous burnout. When the display unit is idle for a set time, preferably about 15 minutes, the display unit goes into the screen saver mode. The set time is user programmable, and thus can be changed by the user. In this mode, the display 24 dims to the lowest brightness level and scrolls horizontally from left to right across the display 24. The display unit exits the screen saver mode upon any key press. The display 24 then returns to its normal brightness and stops the scrolling.

Figure 3:
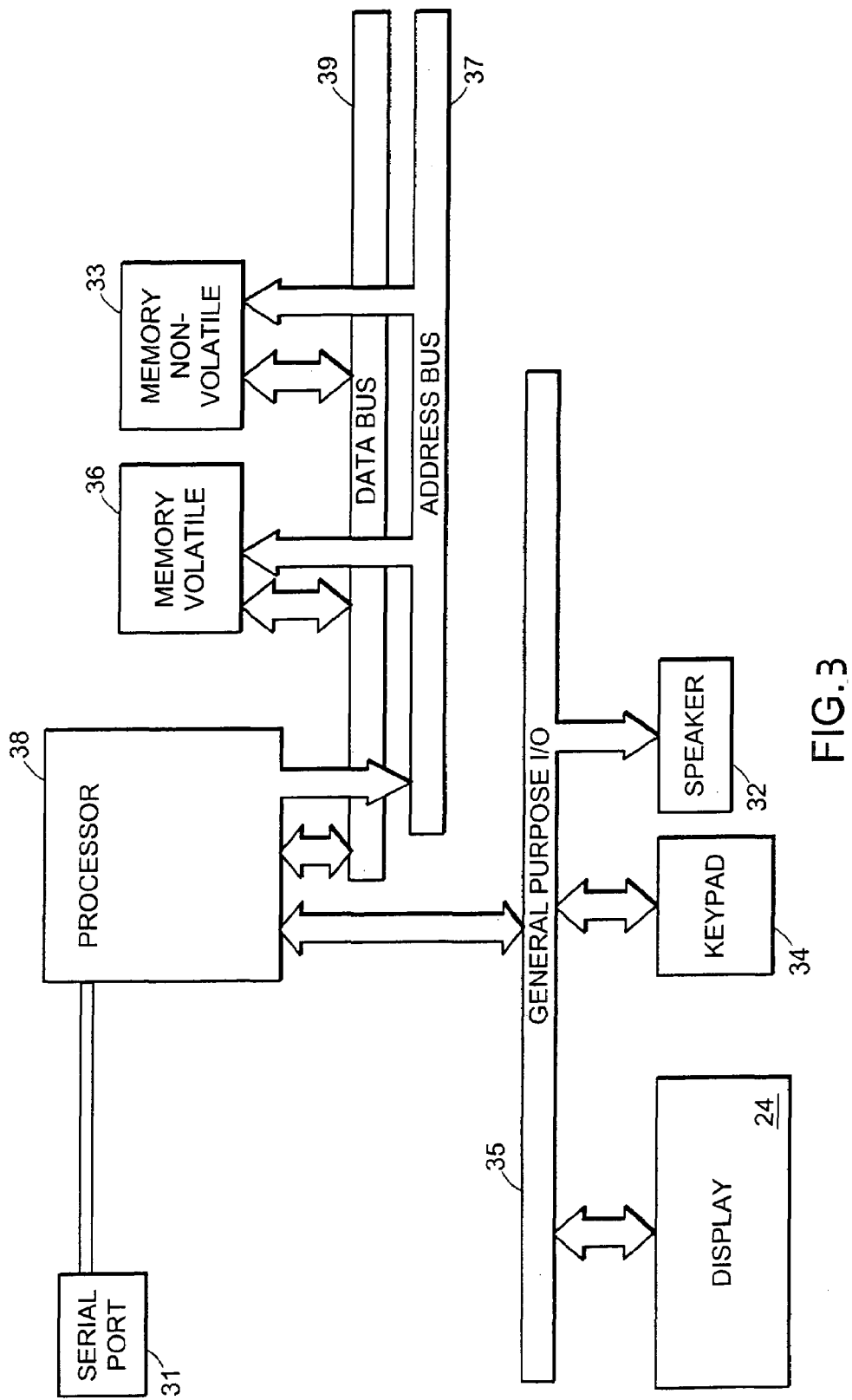
FIG. 3 is a block diagram of the hardware in the display unit of FIG. 2.

A block diagram of the hardware structure of a display unit 10 is provided in FIG. 3. A data bus 39 and address bus 37 link each of the illustrated elements and support data communication.

The display unit 10 further includes a processor 38 which drives the operations of the display unit 10. In one embodiment, the processor 38 is a Motorola microcontroller running at a maximum speed of about 8 Mhz.

Non-volatile memory 33 includes 512 K bytes of memory and volatile memory 36 includes about 128 K bytes of memory. The non-volatile memory 33 stores display and communication features to lessen the burden on the connected device. For example, a character generator and code to handle a cursor, blinking character strings, scrolling features, selector character, and control key modes may be stored in the non-volatile memory. This allows the device to simply send character strings and the display unit generates characters. In addition, the non-volatile memory 33 also supplies the processor 38 with modules for performing a diagnostic process.

A serial port 31 is used to interface with the device. The display unit 10 also receives power from the device through this interface. The serial port 31 is programmable, which may have a default setting of 9600 BPS. The interface to the display is a serial interface utilizing the industry standard USB cable 26. About five volts of power may be provided through the USB cable 26.

The display unit 10 also may include a vacuum fluorescent display 24 having a resolution of 128×64 pixels and an internal speaker 32 which emits a tone to indicate that a key has been pressed. The keypad 34, speaker 32, and display 24 may connect to processor 38 via a general purpose input/output interface bus 35 as shown in FIG. 3.

In a diagnostics process, input/output interfaces such as the speaker circuit, display and control keys are tested. In addition, internal and external loop back tests may be performed to determine the integrity of the RS-232 driver chip and all connections on the serial data path and proper operations of serial port communications. In particular, the speaker circuit is tested by turning the speaker from its lowest to highest volume in a fairly rapid succession. The display 24 is tested by illuminating all the pixels on the display 24. The control keys are tested by displaying the key that was pressed. Diagnostics are preferably initiated by holding down the ENTER key while applying power from the USB cable. The diagnostic title screen and the version of software are displayed when diagnostics are first entered. During the diagnostics, the display unit 10 also provides instructions on how to exit diagnostics.

Figure 4:
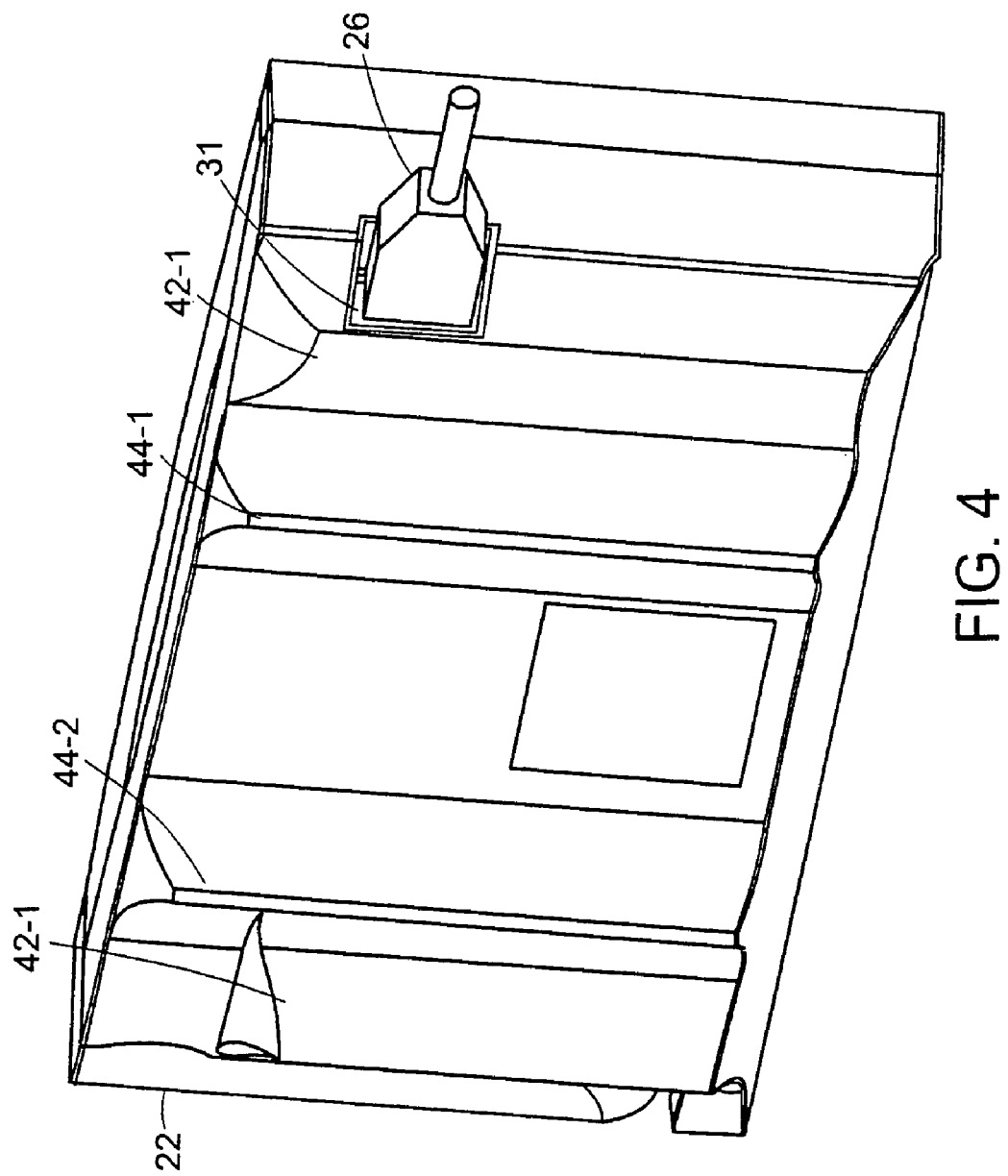
FIG. 4 is a rear view of the display unit of FIG. 2.
Figure 5B:
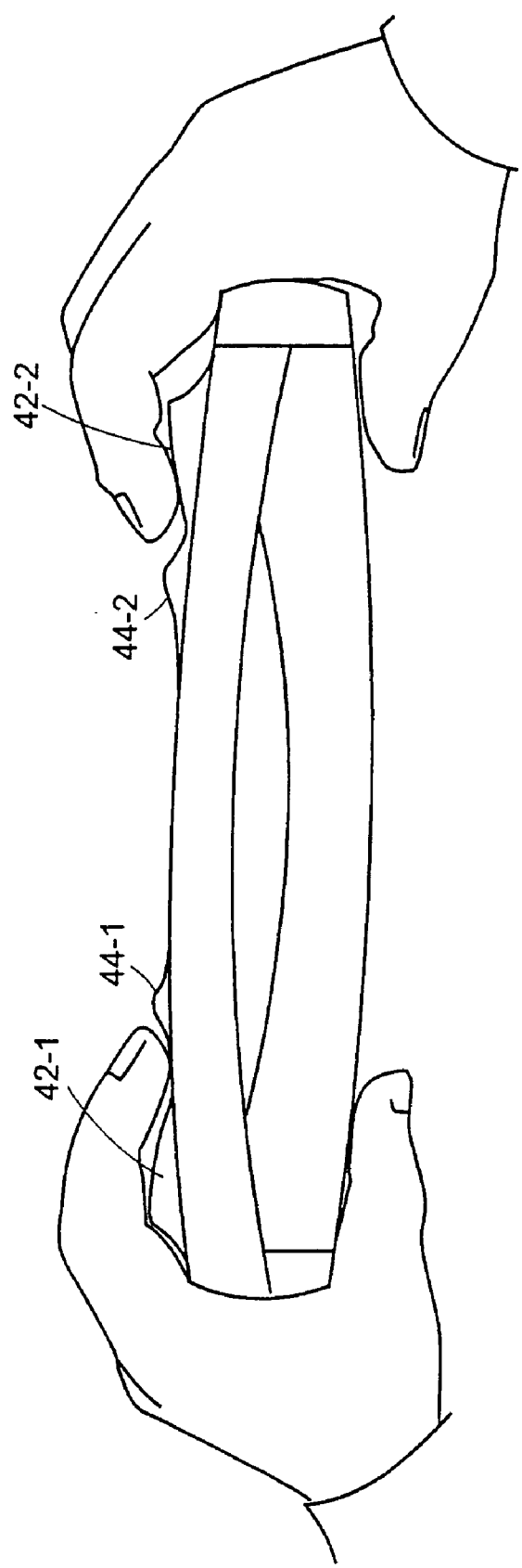
Figure 5C:
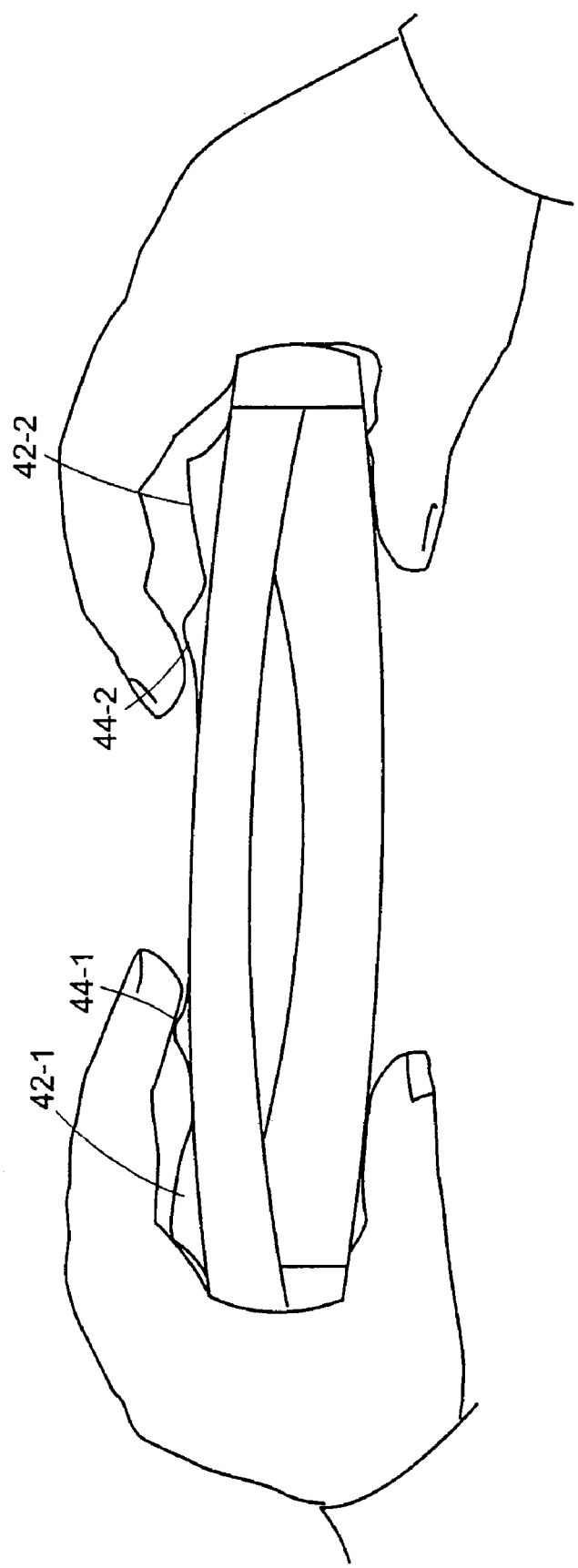

FIG. 4 is a rear view of the display unit 10 of FIG. 1. As illustrated, the back panel of the display unit 10 includes inner hand grips 44-1, 44-2 and outer hand grips 42-1, 42-2. The hand grips 42 and 44 allow a user to firmly hold the portable display unit 10 with either the left or right hand. Preferably, as illustrated in FIGS. 5A–5C, the user uses both hands to hold the display unit 10.

The inner and outer hand grips 42, 44 allow users to firmly hold the display unit so that the user can use one finger to navigate the keys while holding the display in the users' palms. FIG. 5B illustrates the outer hand grips 42-1, 42-2 providing hand grips to users with small to average hands. FIG. 5C illustrates the inner had grips 44-1 and 44-2 being used by a user having large hands.

In addition, the inner and outer hand grips 42, 44 are designed to stabilize the display unit 10 on a horizontal plane. The user can place the display unit on a horizontal plane such as a desk or table and still be able to navigate the keys without the need for holding the display unit down.

Figure 6:
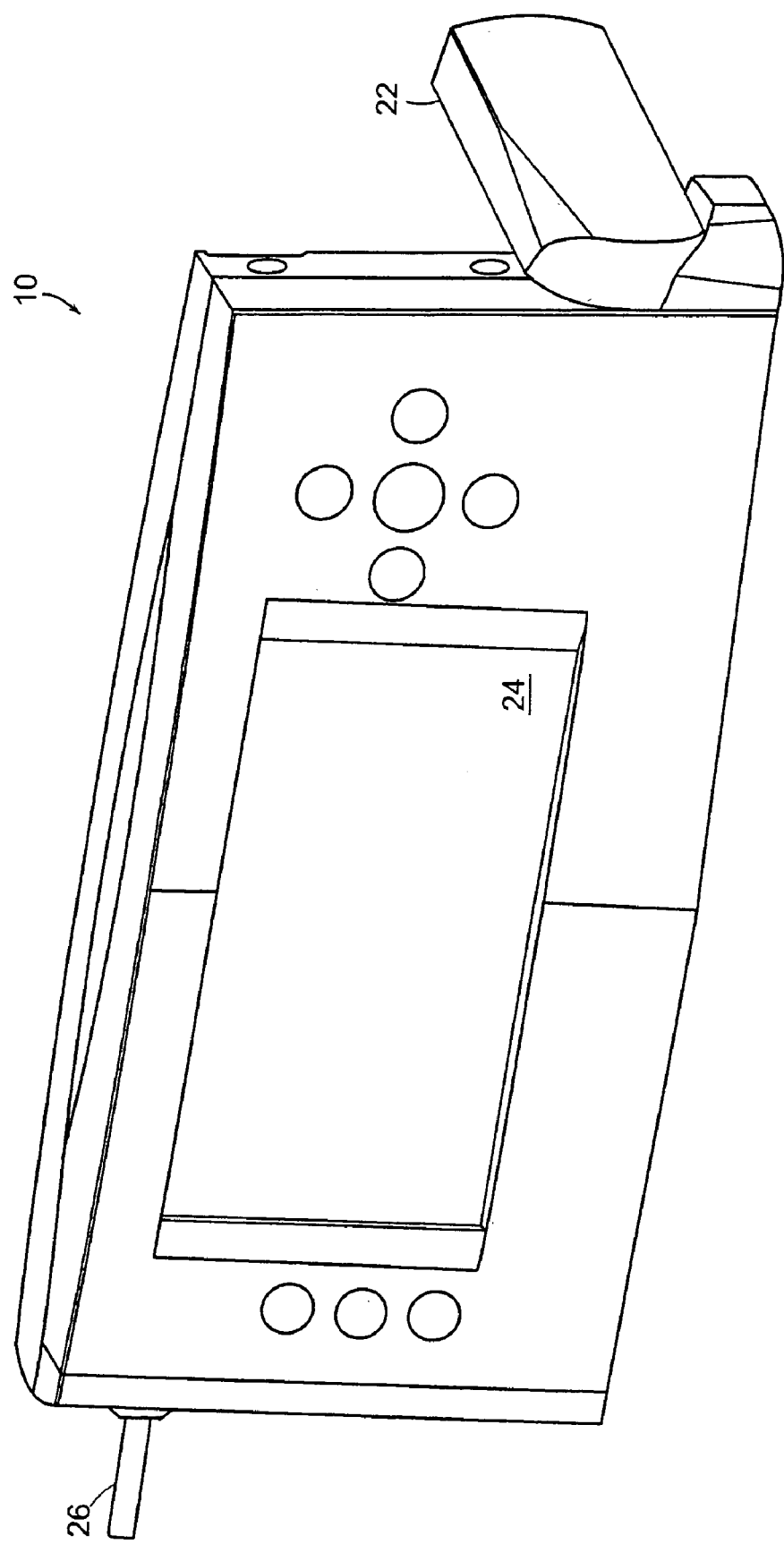
FIG. 6 is a view of the display unit of FIG. 2 illustrating a rest stand.

FIG. 6 illustrates the rest stand 22 rotated about a horizontal axis perpendicularly extending away from the front side of display unit. The rest stand 22 stabilizes the display unit 10 in an upright position. The rest stand 22 is a constant torque hinged stand to support the display unit 10 in various angular positions. The user can place the display unit 10 on a horizontal surface and use the rest stand to tilt the display unit 10 back to view the display 24 in a preferred angle. As illustrated in FIGS. 5A–5C, the rest stand can be rotated to extend vertically along the side of the display unit 10 so that the user can hold the display unit with his hand.

The display unit 10 can also be mounted on a tripod 72, as shown in FIG. 7. A screw connector 52 (FIG. 5A) on the bottom of the display unit 10 allows the display unit to securely mount on the tripod 72. The tripod 72 can be a camera tripod having a rotational mechanism to allow the rotation of the display unit 10. The tripod provides rotational and elevated views of the display. In addition, the tripod provides more stable placement of the display unit on a horizontal surface. The screw connector 52 also may be used to mount the display unit on a bracket.

Returning to FIG. 1, the display unit 10 is connected to a vacuum network controller 12. The vacuum network controller 12 includes a display interface library having source codes and files to communicate with the display unit 10, generate menus specific to the vacuum network controller 12, and request/receive data from the components and devices of the vacuum network controller 12. The display interface library is created when the vacuum network controller 12 powers up. In particular, a display driver object is created to interface to the vacuum network controller's dedicated serial drivers. In addition, a display document object is created to interface to data from the vacuum network controller 12. The display interface also includes a definition of all menus covering programming, controlling and monitoring functions of the vacuum network controller 12.

Figure 8A:
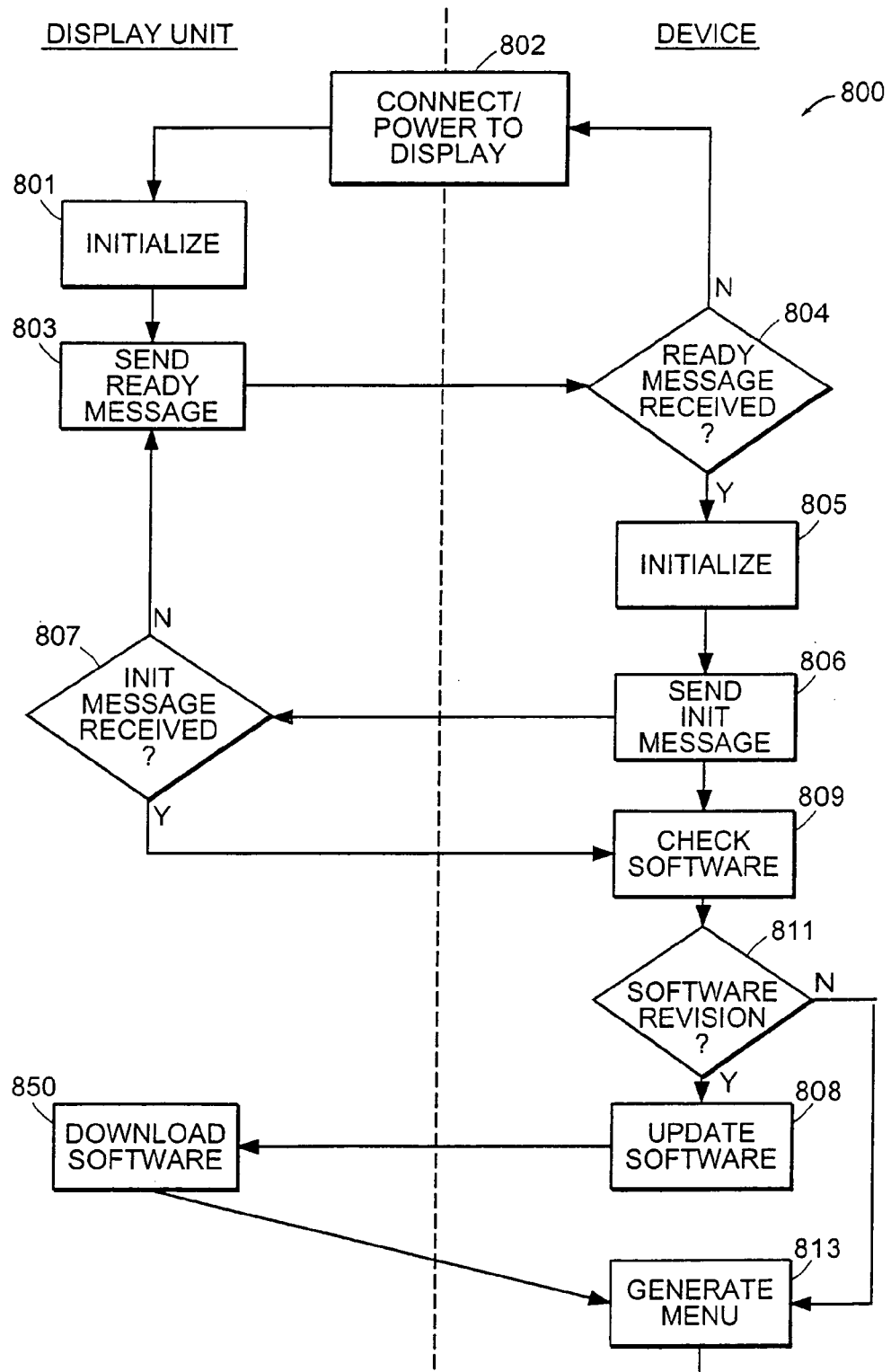
FIG. 8A–8B are flowcharts illustrating the processing steps performed between a device and a display unit in a method of this invention.
Figure 8B:
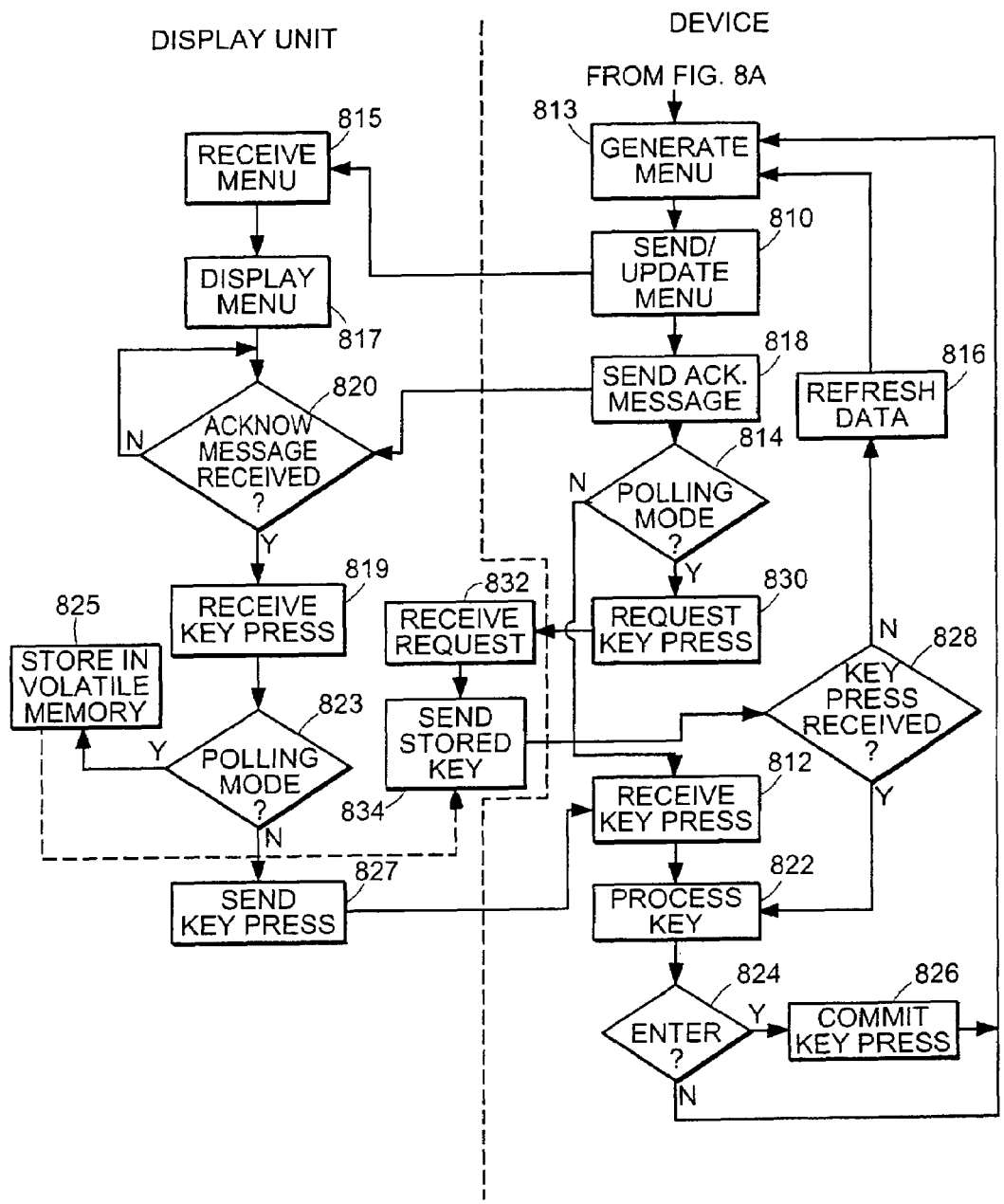

A computer-software-based process for interfacing between a device and the display unit 10 is illustrated in the form of a flow chart in FIGS. 8A–8B. In this example, the device is a vacuum network controller 12. However, as discussed above, the computer-software-based process described below may reside in other system devices to be accessible to the display unit.

When the display unit 10 connects at 802 to the vacuum network controller 12, the display unit 10 also receives power through the connection 26 (FIG. 2). The display unit initializes at 801, and at 803, sends a ready message to the vacuum network controller 12.

Once the vacuum network controller receives a ready message at 804, the vacuum network controller 12 initializes at 805.

If the display unit 10 is disconnected from the vacuum network controller, the vacuum network controller 12 detects that the display unit is no longer connected and resets. For example, the vacuum network controller occasionally sends a test packet to determine whether the display unit is connected. The vacuum network controller 12 monitors the serial port for connection to another display unit.

After initializing the vacuum network controller 12, an initialization message is sent at 806 to the display unit 10. If the display unit 10 does not receive the initialization message from the device at 807, then it sends at 803 another ready message until the initialization message is received. This handshake process indicates that the device and display unit 10 are active and working properly.

After sending the initialization message at 809, the vacuum network controller 12 may check the revision level of the software embedded in the display unit 10 to determine if the software needs to be updated. If it is determined at 811 that the software needs to be updated, then the vacuum network controller 12 updates at 808 the software of the display unit 10 by downloading at 850. In addition, special bitmaps that are not stored in the display unit 10 may be downloaded during this time. For example, a welcome logo may be downloaded and displayed.

Referring to FIG. 8B, once initialization process 800 is complete, the vacuum network controller generates at 813 a menu and sends it at 810 to the display unit 10 (FIG. 1). The display unit 10 receives the menu at 815 and displays it on the display 24 at 817. The vacuum network controller also sends an acknowledgment message at 818.

Once the acknowledgment message is received at the display unit at 820, the display unit 10 receives a key press at 819. Then, the display unit determines at 823 the key press mode. There are two key press modes, polling key press mode and non-polling key press mode. The display unit 10 and the vacuum network controller 12 are preferably in non-polling key press mode unless the vacuum network controller 12 sends a command to the display unit 10 and puts them in polling mode. In polling key press mode, determined at 814 by a device, the display unit 10 accepts a single key press and stores it in volatile memory at 825 until the vacuum network controller 12 sends a command requesting the key at 830. Once the display unit 10 receives the request at 832, the stored key press is sent at 834. Sometimes, there may be no stored key press.

The polling mode is preferably used for monitor menus because the monitor menus are constantly refreshed and only require a key press to exit the menu. In the polling mode, the vacuum network controller 12 may send new data to the display unit 10 without the chance of collisions with key press packets coming from the display unit 10. In the non-polling (interrupt) key mode, a key can be pressed at any time and is immediately sent to the vacuum network controller 12 at 827.

If the menu being displayed is a monitoring menu or, in the polling mode, it is determined at 828 that there is no key press, then, the vacuum network controller 12 refreshes data at 816, generates a menu with a new set of data at 813, and sends the menu to the display unit 10. For example, if the menu is showing the status of compressor 16 including various pressure levels, the vacuum network controller 12 refreshes by requesting for new data and sending the data to the display unit 10.

Figure 9A:
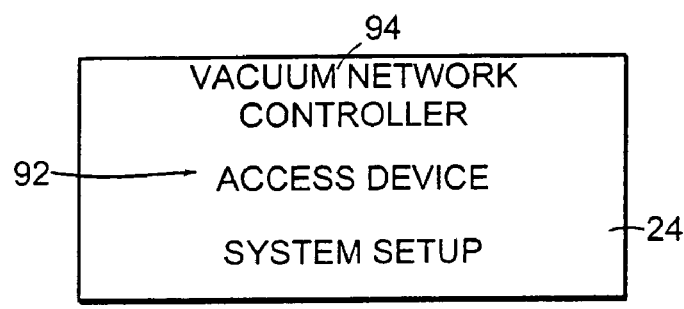
FIGS. 9A–9C are examples of menus.
Figure 9B:
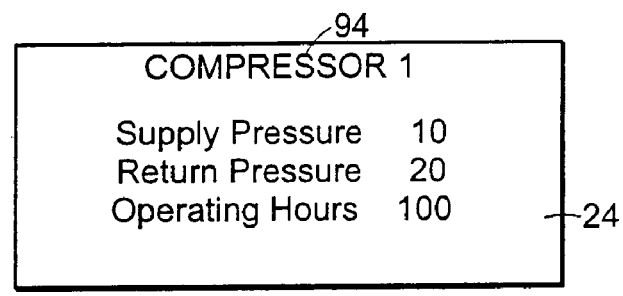
Figure 9C:
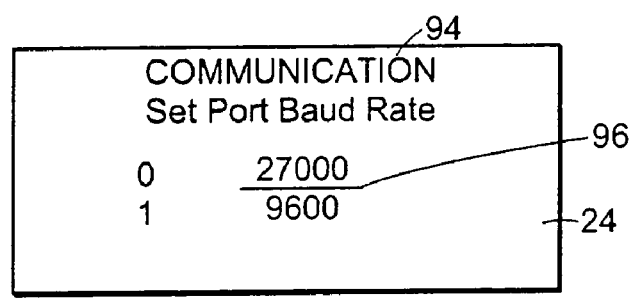

Once a key press is sent at 827 from the display unit 10 to the vacuum network controller 12, the vacuum network controller 12 receives at 812 the key press. The vacuum network controller 12 processes the key press at 822. For example, if the menu is a monitor menu (FIG. 9B) illustrating data, then typically, the key press is for a new screen. However, if the menu is a set up menu (FIG. 9C), a key press may be requesting a new menu or changing a value. For example, as illustrated in FIG. 9C, the user may be changing the BAUD rate of one of the ports.

The vacuum network controller 12 then determines if the ENTER key was pressed at 824. If the ENTER key was pressed, then the key press is committed to non-volatile memory at 826. Otherwise, the key is stored in volatile memory.

After generating a menu at 813, the vacuum network controller 12 sends or updates the menu to the display unit 10 at 810. The menu is generated at 813 by changing a value on the menu or providing a new menu. Thus, at 810, the vacuum network controller 12 sends messages to change a line or a character in the menu. Further, the messages may include a new menu. This loop continues until the display unit 10 is disconnected or screen saver is activated.

The vacuum network controller 12 also supports service session menus. Preferably, these menus are restricted to service personnel. These menus may be restricted by providing access when a password sequence of key entries are made. The service menus provide an interface to the vacuum network controller 12 command parser, so that all commands on the vacuum network controller 12 are directly accessible via the display unit 10. It requires familiarity with the interface commands and is a tool in addition to the screens described to allow maximum flexibility. This takes a string provided by the user and sends it to the vacuum network controller 12 as if it were an OR command line interface. The response is sent to the display unit 10 menu as a text string.

As discussed previously, the display unit 10 may be connected to other devices such as cryopump 18 and compressor 16 to support programming, controlling and monitoring all the functions of the device.

Returning to FIGS. 9A–9C, each menu 94 may be split up into multiple horizontal regions. Each region 92 is capable of displaying up to 21 characters of text or more, containing a selector character, title, data and a cursor. There can be multiple regions per line but the total number of characters displayed by any combination of regions on a single line typically do not exceed 21 characters. Different configuration of the menu may be used according to the user's needs.

In general, commands sent from a device require an acknowledgment from the remote display unit 10. The device can send commands to display text, bitmaps, cursors, check-off boxes, scroll indicators, clear and others. The only commands that the display unit 10 sends are the "ready" command and key press command.

The device includes a definition of all menus specific to the device and the regions within each menu. Each region also may contain a check-off box and an under-bar cursor 96. The region also defines whether it contains data, the attributes of that data and a pointer to the object that "owns" the region. Menus can have static or dynamic regions. Static regions are created once when the device is initialized and are never deleted, e.g. Main menu. A menu with dynamic regions has regions created each time the menu is accessed, e.g., a list of all pumps on the network.

Each screen may be defined as the view of the display 24 that contains up to (8) lines of text and controlled by making entries at the keypad 34 (FIG. 3). The screens will have common attributes that include identical keypad values (direction, enter, home, etc. keys).

FIGS. 10A–10D are an example tree map of menus for a vacuum network controller 12 connected to a display unit 10. The tree map and individual menus may be built according to the user's preference and needs. In addition, the tree map and menus may reside in other system devices to be accessible to the display unit 10 and built according to the needs and features of the device.

After the initialization process is completed, a Main menu 100 is displayed from the vacuum network controller 12. Whenever the HOME button is hit, this screen is displayed. The Vacuum Network Controller 12 Main menu 100 provides options to the following menus: a Monitor menu 104 to monitor various network data and configuration; a Regeneration menu 102 to start regeneration for pumps selected by a user; an Access Device menu 106 to start a session with a pump, or other devices on the network; and a System Setup menu 108 to change and display the configuration of the vacuum network controller 12.

The Regeneration menu 102 allows the user to start or abort a group regeneration. It also displays the current group regeneration state. This state is simply ON or OFF. An OFF state indicates that a group regeneration has not started or is not in progress. An ON state indicates that a regeneration has started or is in progress. This menu is not a monitor screen, so the menu is preferably refreshed when the screen is entered or navigated. Selecting a "Start" option starts to regenerate the pumps. Selecting an "Abort" option stops a group regeneration that is already in progress.

Once the "Start" option is selected, the user enters a Choose Regen Pumps menu 110 showing a list of all pumps currently on the vacuum network. The user is allowed to select pumps to regenerate. If the BACK or HOME key is hit before the "ENTER" option is hit, the display returns to the Main menu and changes made at this screen is discarded.

A List to Regen menu 112 displays all pumps that were selected in the Choose Regen Pumps menu 110 to be regenerated. If the user is satisfied with the list and would like to proceed, the user selects either "start fast regen" or "start full Regen" option and hits the ENTER key. If the ENTER key is pressed, the vacuum network controller 12 starts a group regeneration. If the user is not satisfied and wishes to edit the list, the user may return to the previous menu by pressing the BACK key.

A REGEN Verification menu 114 prompts the user to confirm starting a regeneration. It provides a simple choice to start a Regen or not. If the user decides not to start a Regen, then the user is returned to the previous menu screen and no Regen is started. Otherwise, a FAST REGEN STARTED menu 116 is displayed or a Regen Response menu 118 displays the results and includes an error message if the command fails.

A Regeneration Abort menu 142 provides the user a chance to verify that they want to abort regeneration.

The Monitor Network menu 104 provides access to other menus which display readable data. The data may include both configuration and runtime pump data. This family of menus may be expanded to include other menus according to the user's needs. The data displayed in this branch of menus is refreshed by the vacuum network controller 12 at regular time intervals. In addition, since these menus are monitor menus, they are in poll-key press mode.

Figure 10A:
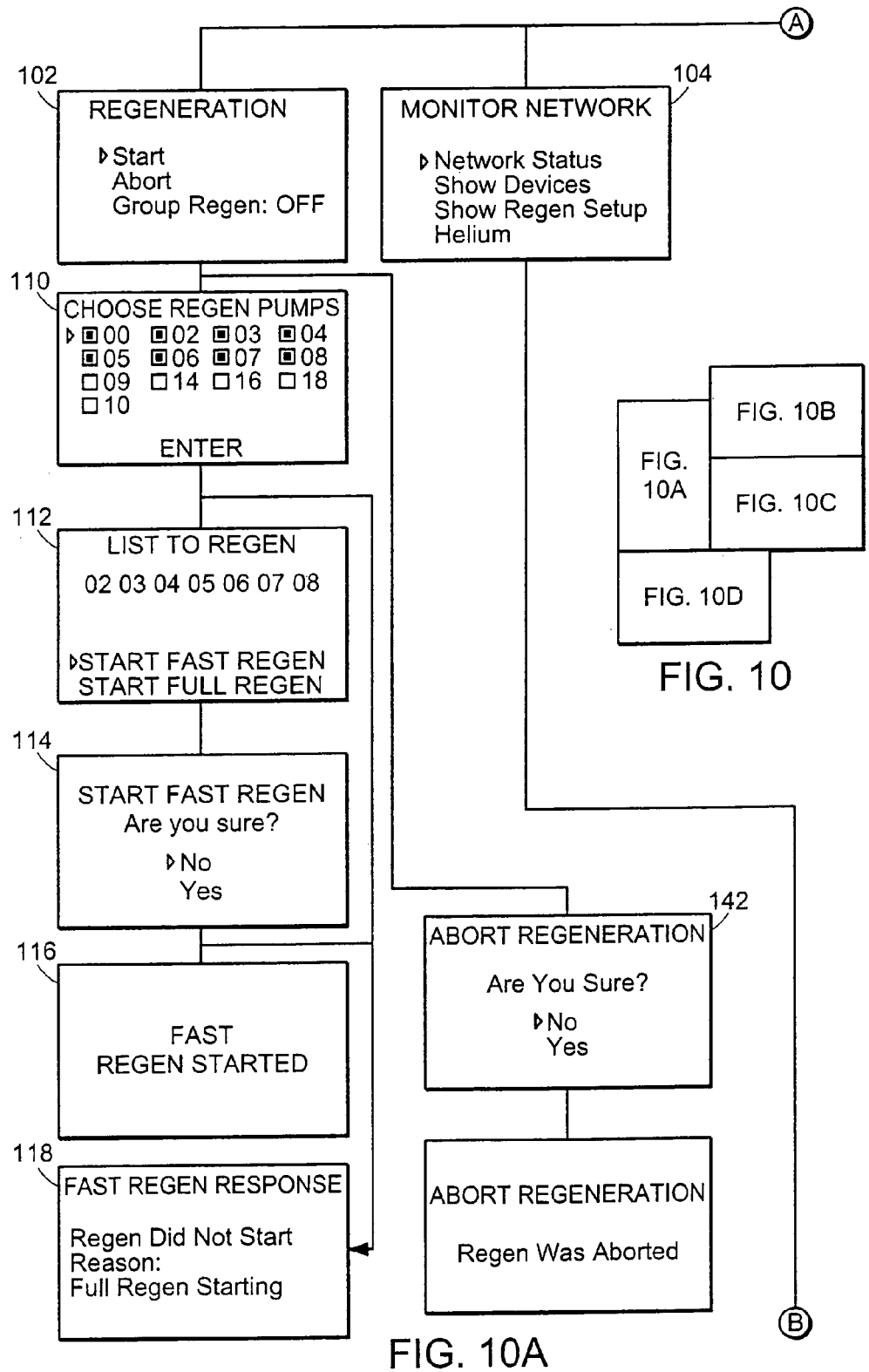
FIG. 10A–10D are an example tree map diagram of vacuum network controller menus.
Figure 10B:
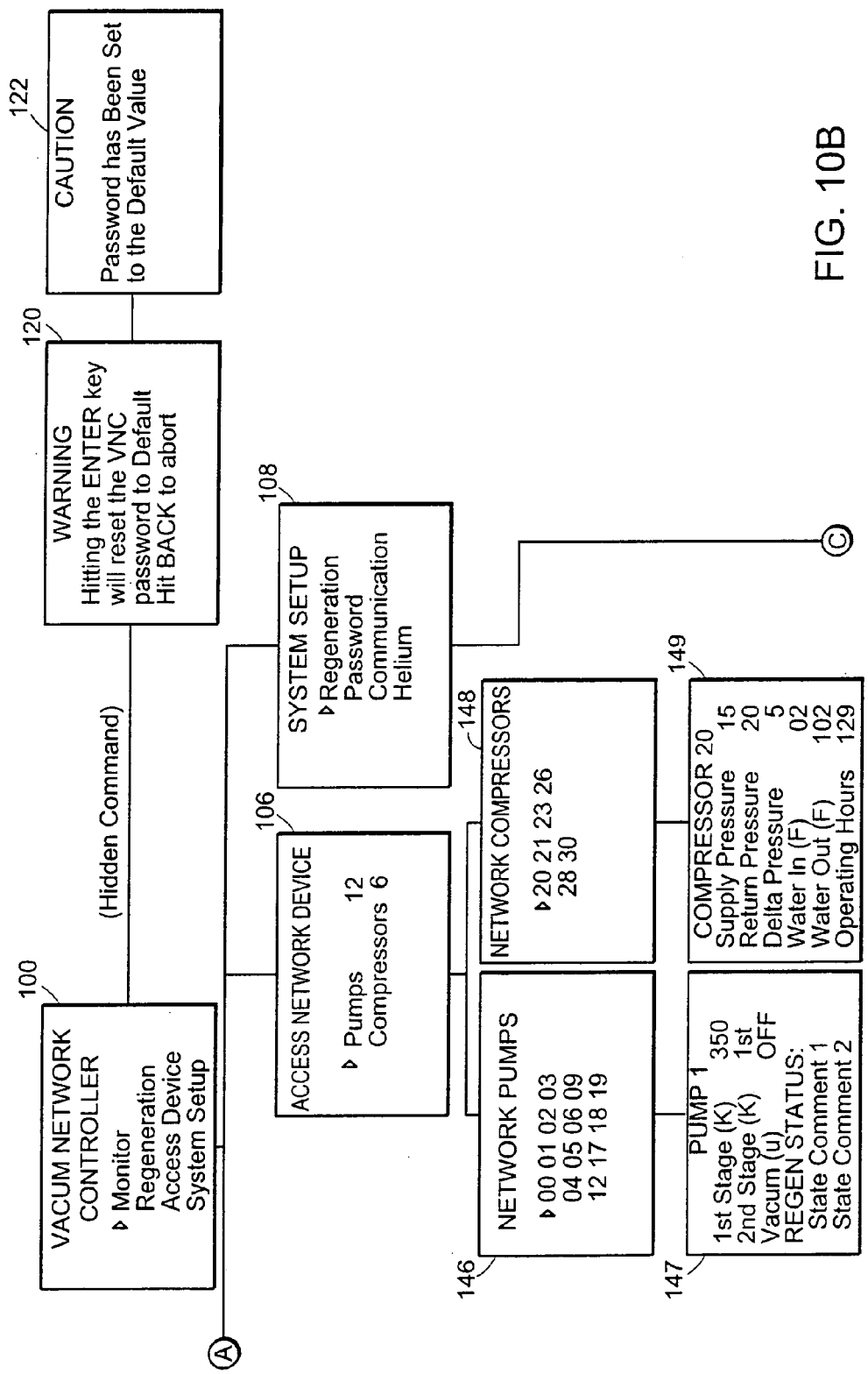
Figure 10C:
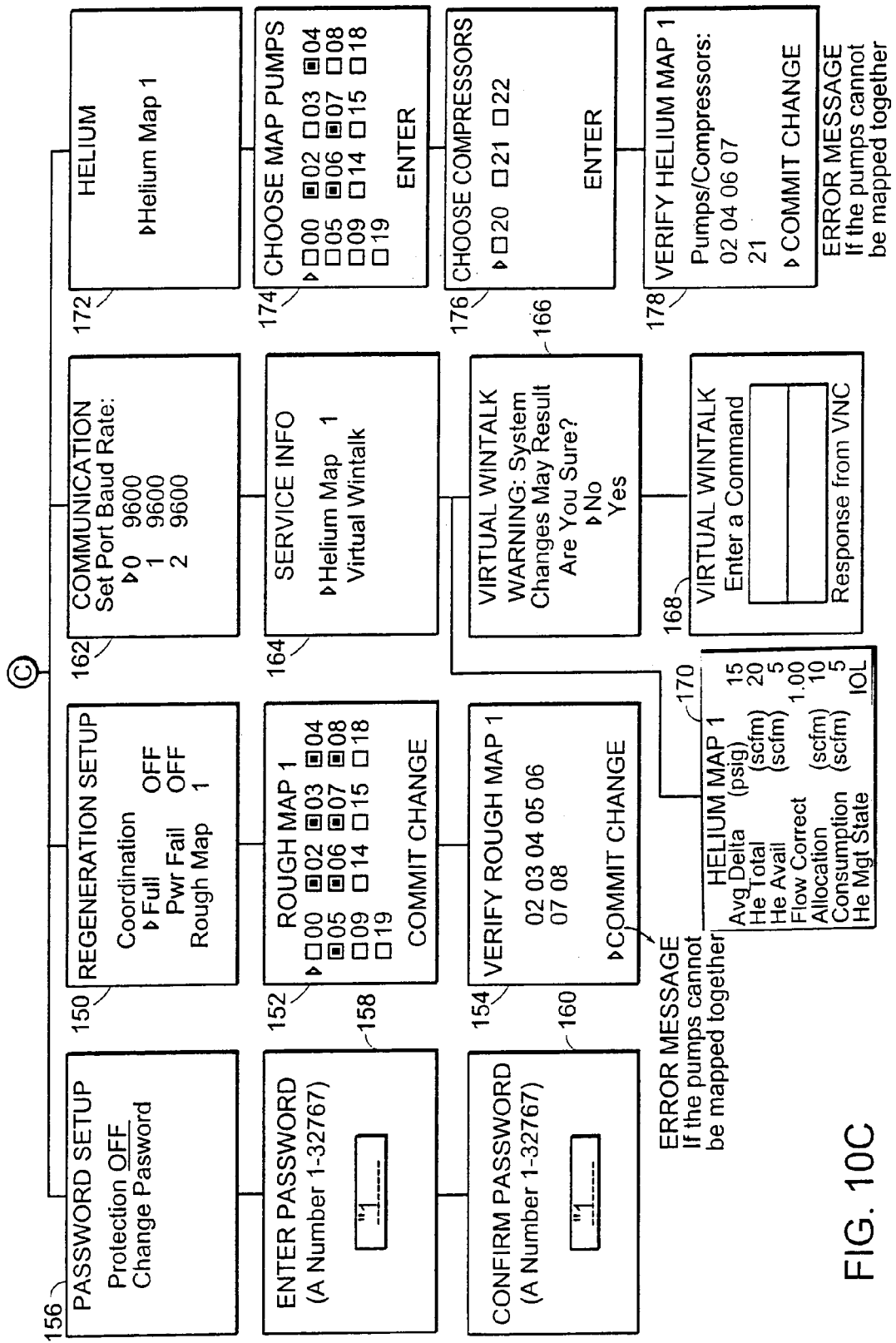
Figure 10D:
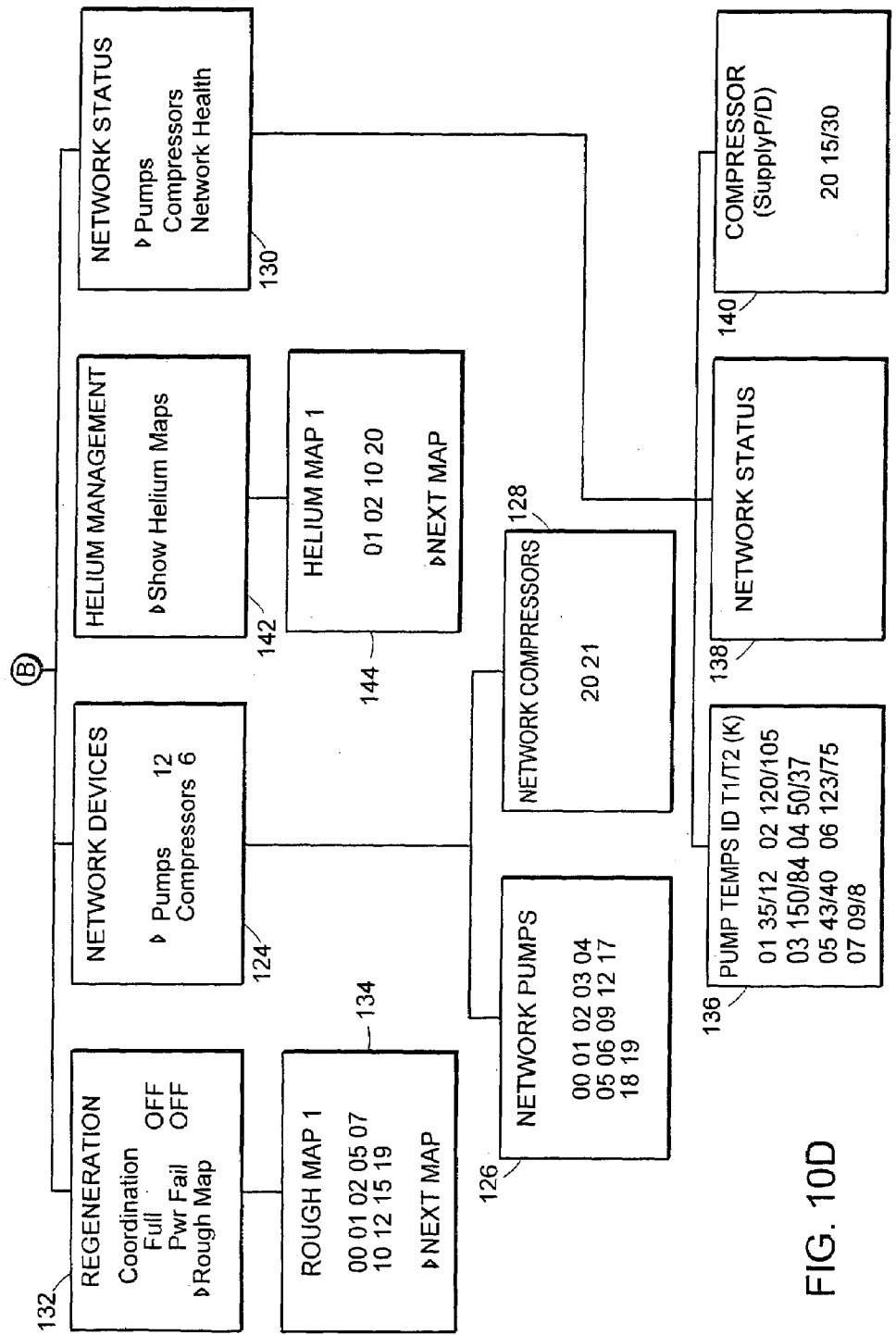

A Network Devices menu 124 of FIG. 10D displays a list of the type and quantity of devices that are on the network. The user can scroll to the type of device they wish to view and hit the ENTER key to proceed to the next menu which identifies each of these devices. For example, a Network Pumps menu 126 identifies every pump on the network and a Network Compressors menu 128 identifies every compressor on the network.

A Regeneration menu 132 allows the user to peruse the roughing maps and other regeneration configuration data. To view the roughing maps, the user hits enter and is taken to a screen that shows a Rough Map 1 menu 134. The user can navigate through all maps from that screen.

A Network Status menu 130 provides options to monitor device parameters across the network. The options may include a Pump Temperatures menu 136 which provides T1 (first stage) and T2 (second stage) temperatures for all pumps on the network. For example, pump 1 has T1 and T2 temperatures of 35 K and 12 K respectively. The Network Status menu 130 may also include other device parameters for each pump. A Compressor Pressures menu 140 displays the Supply and Delta pressure for all compressors on the network.

A Network Status menu 138 indicates the status of the network. The vacuum network controller 12 scans the network and return a list of all devices on the network. Any problems that are discovered are flagged, otherwise the user receives an indication that the network is operating correctly. Preferably, the Network Status menu 138 does the following: scan the network for all devices; verify every device on the network is also on a helium map; indicate all devices on the network and in the helium map with the Serial Number and Software Revision; devices that are on the network but are not in a helium map are flagged; and devices that are not on the network but are in a helium map are also flagged.

A Helium Management menu 142 provides a Show Helium Maps menu option for a Show Helium Maps menu 144 that allows the user to view each Helium Map.

The Access Network Device Screen 106 of FIG. 10B allows the user to access an individual pump or other network devices such as a cryopump. The user initially selects the type of devices to access. The quantity of each type of device currently on the network are displayed. An option to switch a device "on" and "off" may also be included. The user may scroll to the device and access it by hitting the ENTER key. An Access Network Pumps 146 menu allows the user to select a pump number from a list of pumps on the network and open a session with the selected devices. The display unit 10 then accesses the pumps directly, and the vacuum network controller 12 transfers data between the two. Thus, the menu maintenance stays within the device that provides the menus.

The user sees a list of pumps on the network and selects one with the cursor. After the enter button is hit, the Pump session is launched. If the pump is directly connected to another display unit, then the pump locks the local display unit. The lock on the local display unit is released when the session is terminated. The pump's local remote display (RD) displays the Pump Main menu. The pump session on the vacuum network controller 12 appears as if the display unit 10 were directly plugged into the pump. The vacuum network controller 12 is able to detect if the pump is no longer able to communicate with the vacuum network controller 12 (from a network error or the pump being taken offline) during a session and terminates the session. An intermediary screen may be provided to choose the type of device.

The Access Pump menu 147 is a monitor-like screen that contains Temperature 1, Temperature 2, Cryo TC (Vacuum) and current Regen Status. The Access Pump menu 147 may also include other pump data.

Access Network Compressor menu 148 is similar to the Access Network Pump menu 146 and provides similar data of compressors on the network.

A Compressor Data menu 149 is provided until compressor sessions are supported.

The System Setup menu 108 includes menus that are configured and generally not accessed by the user. The Password Setup menu 156 sets up a user password to enter all menus except the monitor menu. The Regen Config menu 150 includes all regeneration related configurations. The Data Communication menu 162 sets data communication parameters and provides a hidden entry into virtual command interface sessions.

The Regeneration Setup menu 150 provides the configuration of regeneration parameters. To configure a rough map, the user scrolls to that region, hits ENTER, and scrolls the map ID's until getting to the one desired. The user then hits ENTER again to go to the configuration screen. Full coordination and Power Failure Coordination are also set on/off by scrolling on this screen.

A Rough Map menu 152 allows the user to configure the map by selecting or deselecting the pumps to be members of the map and hitting ENTER to create the map. All pumps on the system are displayed. The pumps already in the map may be removed from the list or left on it.

After selecting the pumps for the map, the user scrolls down to "ENTER" and hits enter to create the rough map. Before entering the change, the user may hit the BACK key or HOME key to cancel the change. The configuration is not changed until the "COMMIT CHANGE" option is chosen on the next screen and the ENTER key is hit. If an error prevents the rough map from being configured, a menu informs the user and returns to the last screen to reconfigure the map.

A Password Setup menu 156 of FIG. 10C allows the user to select password protection by selecting "Change Password" option to set a password and turning "Protection" on. When the user turns Protection on, the user is prompted to set the password. The Enter Password menu 158 allows a user to enter a password. The Confirm Password menu 160 confirms the password. To enter any branch off the main screen except the "Monitor" menu, the password is required. When Protection is turned off, no password is required.

A Secret Password Reset feature, as shown in FIG. 10B, may be provided to reset the password to a default value. The user may reset the password in case the password is forgotten, without requiring field support. The password reset function is implemented from the main screen by pressing a combination of keys. When a correct combination of keys are pressed, e.g. a "hidden command," a Warning menu asks the user if he wants to reset the password. By pressing the Enter key, password reset is completed and Caution menu 122 is displayed.

At the Confirm Password menu 160, as shown in FIG. 10C, the user may hit the Back key before committing the data if he decides not to change or set a password. If confirmation fails, then an error message may result. If confirmation is successful, then a message indicating success may be displayed. There may be pop-up screens to guide the user if the entered password is not within the required range.

A Data Communication menu 162 provides access to the communication parameters. The vacuum network controller determines which ports are available. The user may change a value by scrolling to the parameter and setting a new value.

There may be several hidden screens that can be accessed from the COMMUNICATION screen by hitting a combination of keys or keys in sequence. The hidden screens allow service personnel to access data that the user either does not need to access, because it is easily misinterpreted and may not be significant to their operation, or should not access, because unintended misuse could have a negative impact on their system.

The Hidden screens may be entered via the Service Info menu 164 which include options to view Map data or enter a Virtual command interface session.

A Hidden Virtual Command Session menu 166 is a yes/no verification menu to verify whether the user wishes to enter a session.

A Virtual Command Session menu 168 may include two boxes. The first one may be to enter commands to the vacuum network controller 12 and the second one may be to see the vacuum network controller's response to the command.

A Hidden Helium Map menu 170 of FIG. 10C displays data that the user does not need to access. A Helium Setup menu 172 allows the user to select which Helium Map they want to configure by entering the number. Numbers are scrolled like other screens with the UP/DOWN arrow keys and committed by pressing the ENTER key. A Choose Helium Map Pumps menu 174 is similar to the Rough Map menu 152 and allows the user to select pumps. A Choose Helium Map Compressors menu 176 is similar to the Rough Map menu 152 and Choose Helium Map Pumps menu 174 and allows a user to select compressors. A Verify Helium Map Setup menu 178 displays the Helium Map and allows the user to accept (COMMIT) or reject it. The Verify Helium Map Setup menu 178 is similar to the Verify Rough Map Menu 154.

Figure 11A:
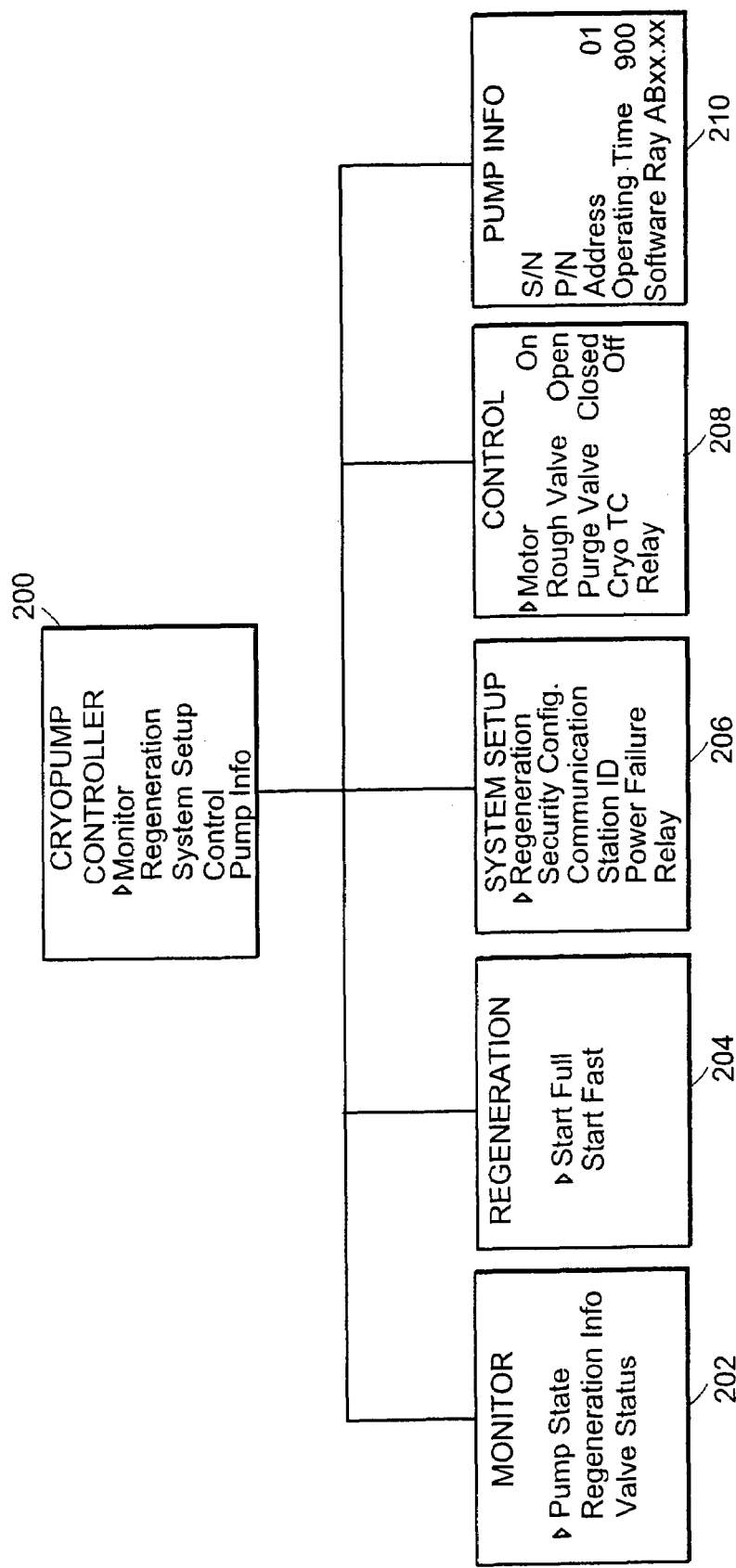
FIGS. 11A–11D are example tree map diagrams of cryopump controller menus.

FIG. 11A is an example tree map of menus for a cryopump 18 connected to a display unit 10-5.

A Pump Main menu 200 displays the name of the device, and provides the user with options to enter the following menus: a Monitor menu 202 which monitors temperature and pressure values, temperature control parameters, and regeneration status; a Regeneration menu 204 for starting, stopping, or aborting a full or fast regeneration; a System Setup menu 206 which allows configuration of Regeneration setup, Security, Communication, Station ID, Power Fail Recovery parameters, and Relays; a Control menu 208 which allows manual control of various parts of the Cryopump; a Pump Info menu 210 which displays information about Software revisions, serial number, part number, address and operating time.

Figure 11B:
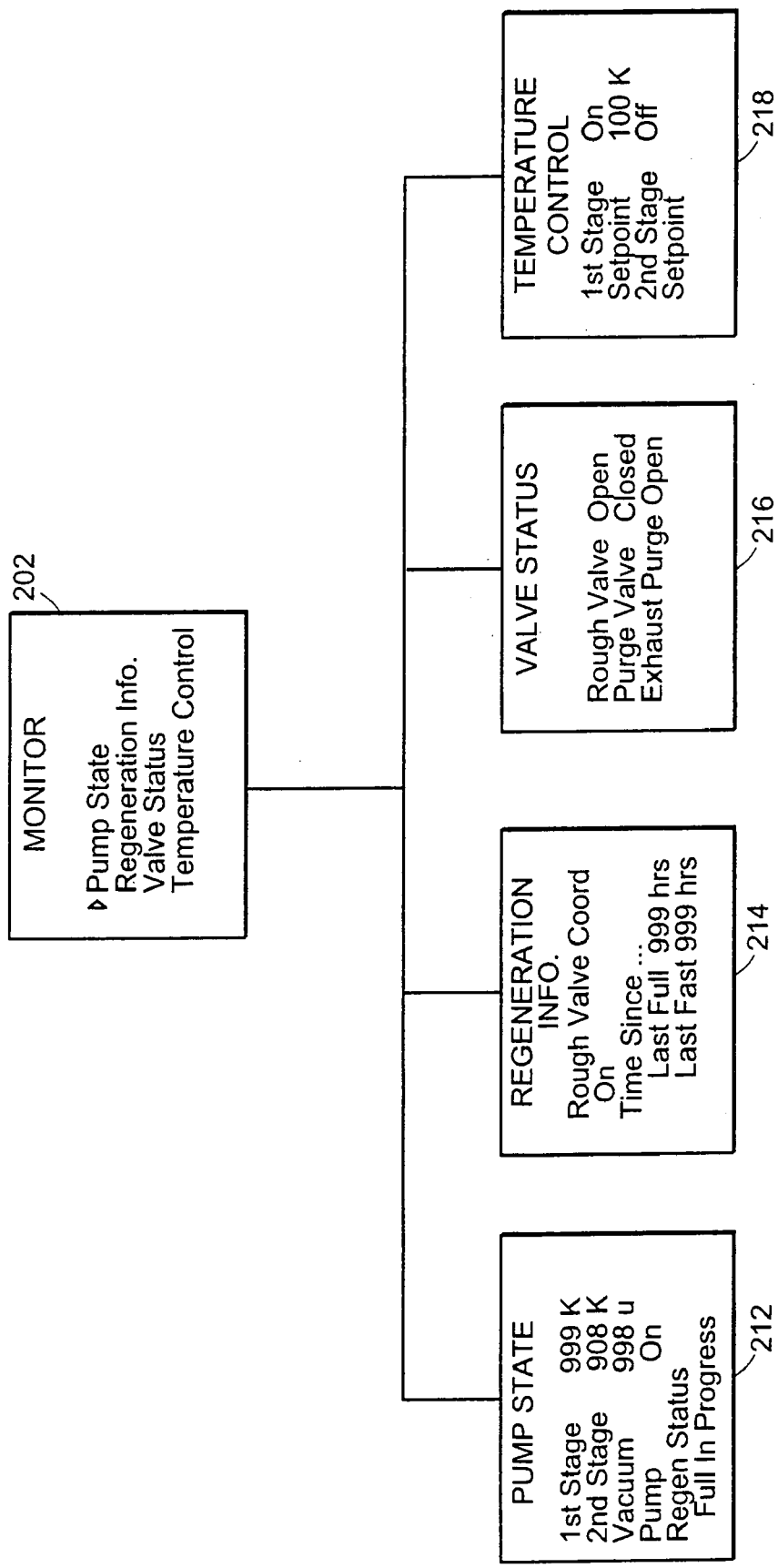

FIG. 11B illustrates an example Cryopump Monitor menu tree map. The Monitor menu 202 allows access to children menus to view information on Pump State 212, Regeneration Information 214, Valve Status 216 and Temperature control 218.

Figure 11C:
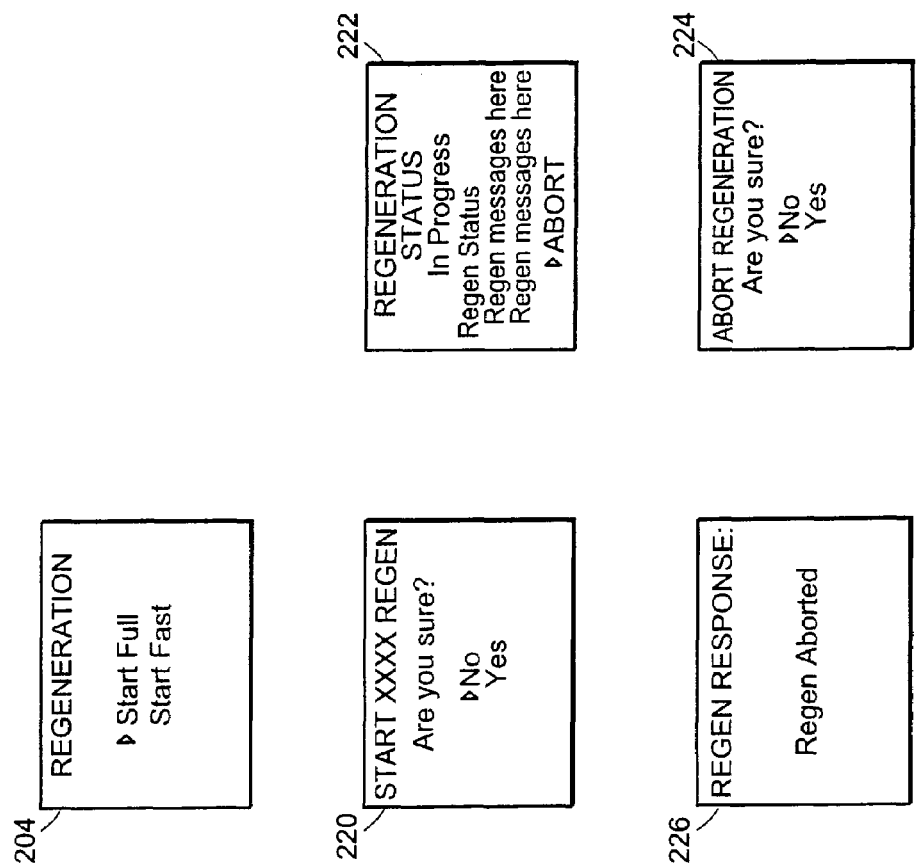

FIG. 11C illustrates an example Cryopump Regeneration menu tree map. The map includes the Regeneration start menu 204 to confirm starting regeneration, a Regen Verification menu 220, a Regeneration status menu 222, a Abort Regeneration menu 224 for aborting regeneration in progress, and Regeneration Response menu 226.

Figure 11D:
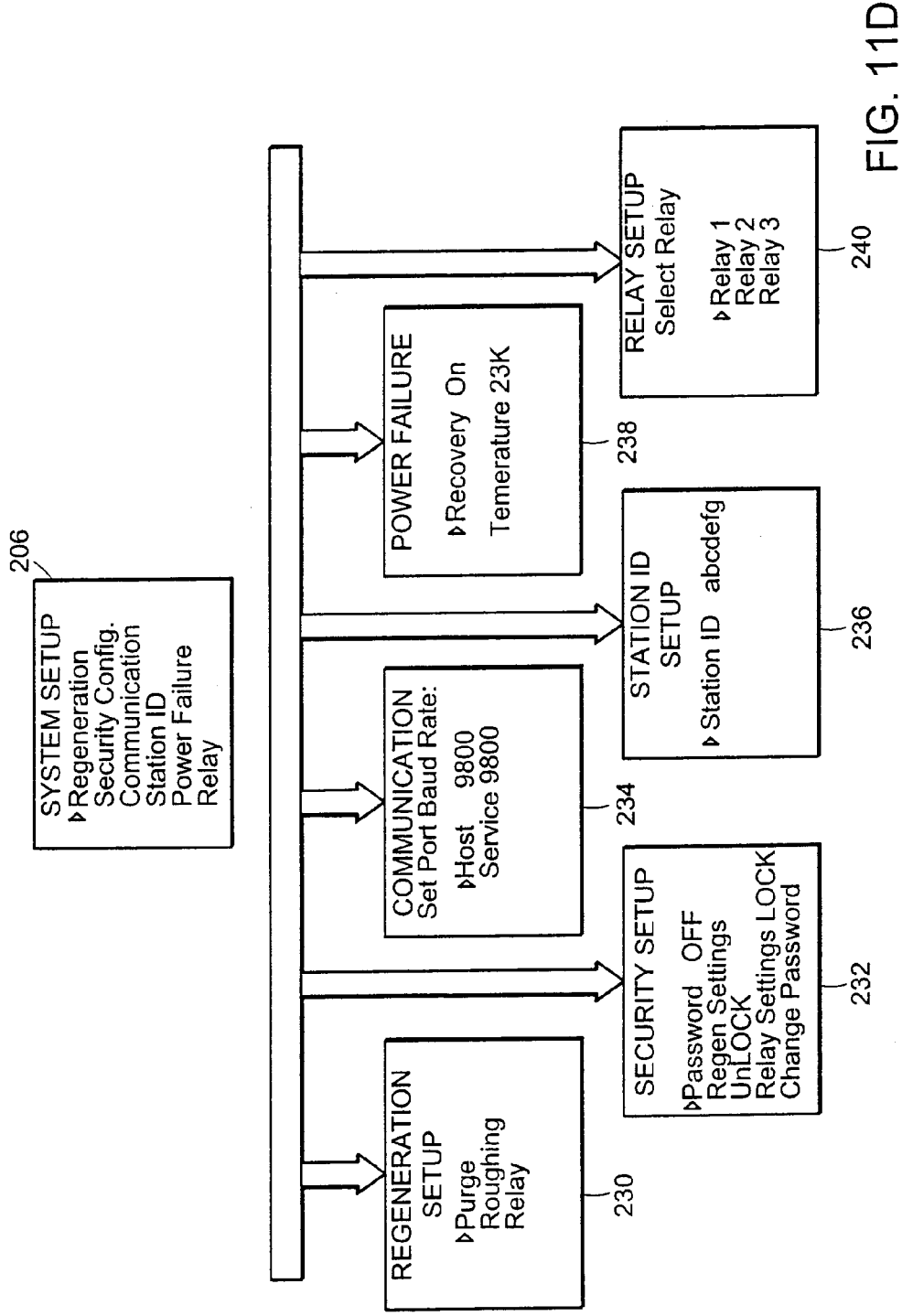

FIG. 11D is an example tree map of Cryopump System Setup menus. The System Setup Main menu 206 provides a Regeneration Setup menu 230 providing a selection of regeneration setup categories, including regeneration purge setup, regeneration roughing setup and regeneration delay setup. The System Setup menu 206 also provides an option to a Security Setup menu 232, a Station ID menu 236 to identify the station, a Power Fail Setup menu 238 to configure Power Failure parameters, a Communication Setup menu 234 and a Relay Setup menu 240 to select a relay to configure.

The Control menu 208 (FIG. 11A) allows the user to control various parts of the cryopump including motor, rough value, purge value, vent valve and relays. The Pump Info menu 210 allows the user to view pump serial number, part number, network address, operating time and software revision.

The user may also access a Service menu by pressing a combination of keys or keys in a sequence. The menu includes information about Management parameters, Temperature Control Parameters, and Software versions for the individual modules in the pump. In addition, the menu may provide access to hidden menus for entering a virtual command session.

Referring back to FIG. 1, the menus for the cryopump 18 also may be accessed and displayed on the remote display unit 10-1 that is connected to the vacuum network controller 12 through a remote session. Similarly, the remote session may be made with other devices to provide access and display menus of the selected device on the remote display unit 10-1. For example, the user may create a remote session from the vacuum network controller 12 by navigating to a menu which allows the user to choose a device such as a cryopump 18, waterpump 10, turbopump 15, gauges 17, compressor 16 or roughing pump 14 on the network, and start a remote session.

The devices and vacuum network controller 12 communicate with each other over the network using the bitbus master/slave protocol. When the vacuum network controller 12 is designated as the master, the devices respond to requests from the vacuum network controller 12. Thus, in a remote session, the vacuum network controller 12 is used to drive the session. The vacuum network controller 12 may perform this in a loop:

Send request (bitbus) to the device for a command;
If got command, send it to the remote display unit (serial) and get response (serial);
Send the remote display unit's response to the device (bitbus);
Start over.

When a device receives the vacuum network controller's open session request but already has a display unit 10-5 directly plugged into it, the device locks out the display unit 10-5 and displays a message to the user that there is a remote session running. If, at the time of open session request, there is no local display unit directly connected to the device, but a display unit is connected after a remote session has started, then the local display unit directly connected to the device is locked out and the remote session message is displayed.

Since the device can send commands to the vacuum network controller 12 at vacuum network controller's request, the vacuum network controller 12 sends a command to the device over bitbus asking the device if it has any commands for the remote display unit 10-1. The vacuum network controller 12 also sends different commands to return responses from the remote display unit 10-1 to the device.

A display unit 10 communicates using packets that can vary in length. Packets having 4 to 25 bytes are used, but packets of other sizes may also be used. The bitbus protocol used in the network may be set up to send 13 byte packets. However, the bitbus protocol can also be configured for different packet lengths.

To get around this restriction on the payload length of the bitbus packets, serial packets from the display unit 10 are fragmented and reassembled after sending them over the bitbus network. For example, in a remote session with the cryopump 18, the cryopump 18 breaks a serial packet, which is meant for a local display unit 10-5, up into fragments if it is greater then 13 bytes and sends it to the vacuum network controller 12. In particular, each serial packet, or fragment of a packet has length added to it at the beginning of the packet. The serial packet is then embedded into a bitbus packet, and sent over the bitbus network to the vacuum network controller 12. The vacuum network controller 12 gets the packet and reconstructs the fragments into a single serial packet. The vacuum network controller 12 then sends the serial packet to the remote display unit 10-1.

Similarly, when the vacuum network controller 12 receives a response from the remote display unit 10-1, the vacuum network controller 12 embeds the response into a bitbus packet and sends it to the cryopump 18 appended onto a command string which indicates that this is a response from the remote display unit 10-1. Thus, the remote display unit 10-1 attached to the vacuum network controller 12 receives serial commands and sends responses without knowing that the origin is a device somewhere else on the network. In addition, the packets and responses may be stored in buffers on the device.

To close a remote session, the user may hit a BACK key from the device's main menu. The device then sets a command to close the session and sends the command to the vacuum network controller 12 at the next vacuum network controller's request. The vacuum network controller 12 then gets the close command and sends the close session command to the device so the remote session is closed.

As stated above, a remote session may be established between the remote display unit 10-1 connected to the vacuum network controller 12 and any device such as a waterpump 19, cryopump 18, turbopump 15, gauges 17, compressor 16, or roughing pump 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communicating with plural devices comprising:
   storing a display controller in each of plural devices of different types, each display controller generating display menus specific to the type of device;
   providing a portable display unit having a display and control keys;
   connecting the portable display unit to a first device of a first type, selected from the group consisting of a vacuum network controller, a cryopump, a roughing pump, a compressor, a water pump, a gauge and a turbopump, receiving menus from the first device specific to its type, displaying the menus on the portable display unit, and forwarding messages to the first device from the portable display unit to indicate activation of control keys; and
   connecting the portable display unit to a second device of a second type, receiving menus from the second device specific to its type, displaying the menus on the portable display unit, and forwarding messages to the second device from the portable display unit to indicate activation of control keys.

2. The method of claim 1 wherein the second device is selected from the group consisting of a vacuum network controller, a cryopump, a roughing pump, a compressor, a water pump, a gauge and a turbopump.

3. A method according to claim 1, further comprising: establishing a remote session between the portable display unit and the first device.

4. The method of claim 3 wherein the plural devices are used in a fabrication plant.

5. A method according to claim 1, further comprising: receiving menus from the first device specific to its type, displaying the menus on the portable display unit, and forwarding messages to the first device from the portable display unit which is connected to the second device to indicate activation of control keys.

6. A method according to claim 1, wherein the display menus include hidden menus specific to the first device.

7. The method of claim 6 wherein the display menus include menus to monitor the first device.

8. The method of claim 6 wherein the hidden menus provide a command interface.

9. A method of communicating with plural devices comprising:
   storing a display controller in each of plural devices of different types, each display controller generating display menus specific to the type of device;
   providing a portable display unit having a display and control keys;
   connecting the portable display unit to a first device of a first type, receiving menus from the first device specific to its type, displaying the menus on the portable display unit, and forwarding messages to the first device from the portable display unit to indicate activation of control keys;
   connecting the portable display unit to a second device of a second type, receiving menus from the second device specific to its type, displaying the menus on the portable display unit, and forwarding messages to the second device from the portable display unit to indicate activation of control keys;
   initializing the portable display unit and the first device subsequent to connecting the portable display unit to the first device to assure proper connection between the portable display unit and the first device; and
   checking software on the display unit to determine whether the software version is compatible with the one on the first device.

10. The method of claim 9 further comprising the step of forwarding bitmaps specific to the first device.

11. A device comprising:
    a processor;
    a display interface in communication with the processor, the display interface providing a connection to a display unit;
    a computer-readable medium in communication with the processor, the computer-readable medium storing computer-executable software code for:
      providing a display driver for communication with the display unit;
      generating a first menu specific to the device;
      communicating the first menu to the display unit for display;
      receiving a key entry from the display unit;
      processing the key entry;
      generating a second menu in response to the key entry; and
      communicating the second menu to the display unit for display.

12. The device of claim 11 further comprising software code for committing the key entry upon activation of the enter key.

13. The device of claim 11 wherein the device is selected from the group consisting of a vacuum network controller, a cryopump, a roughing pump, a compressor, a waterpump, a gauge and a turbopump.

14. The device of claim 11 wherein the display interface is a serial port.

15. The device of claim 11 further comprising software code for retrieving monitor data from device components.

16. The device of claim 15 wherein the software code generates the second menu by refreshing monitor data in the first menu.

17. The device of claim 11 wherein the software code generates the second menu by changing set data in the first menu.

18. A method for displaying a menu on a portable display unit comprising:
    connecting the portable display unit to a device;
    initiating the display unit and the device to assure a proper connection between the display unit and the device;
    at the device, generating a first menu and communicating the first menu to the display unit;
    from the display unit, forwarding a key entry; and
    at the device, processing the key entry, generating a second menu in response to the key entry, and communicating the second menu to the display unit.

19. The method of claim 18 further comprising resetting the device when the portable display unit is disconnected from the menu.

20. The method of claim 18 further comprising periodically forwarding initialization messages from the device to the display unit to assure a proper connection between the display unit and the device.

21. The method of claim 18 further comprising at the display unit, receiving the first menu from the device and displaying the menu.

22. The method of claim 18 wherein second menu is the menu having refreshed data.

23. The method of claim 18 further comprising at the display unit, the step of receiving a key request from the device.

24. The method of claim 18 wherein the second menu is a new menu with different regions and data.

* * * * *